United States Patent
Sakurai

(10) Patent No.: US 12,431,045 B2
(45) Date of Patent: Sep. 30, 2025

(54) DISPLAY MEDIUM, PROCESSING APPARATUS, PROGRAM, AND COMPUTER-READABLE RECORDING MEDIUM PROVIDED WITH PROGRAM RECORDED THEREON

(71) Applicant: DWANGO CO., LTD., Tokyo (JP)

(72) Inventor: Kaisei Sakurai, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 343 days.

(21) Appl. No.: 18/042,869

(22) PCT Filed: May 30, 2022

(86) PCT No.: PCT/JP2022/021904
§ 371 (c)(1),
(2) Date: Feb. 24, 2023

(87) PCT Pub. No.: WO2022/264793
PCT Pub. Date: Dec. 22, 2022

(65) Prior Publication Data
US 2023/0306880 A1   Sep. 28, 2023

(30) Foreign Application Priority Data

Jun. 14, 2021   (JP) .................. 2021-098966

(51) Int. Cl.
*G09F 19/14*   (2006.01)
*G09F 9/30*   (2006.01)
*G02B 30/26*   (2020.01)

(52) U.S. Cl.
CPC .............. *G09F 19/14* (2013.01); *G09F 9/30* (2013.01); *G02B 30/26* (2020.01)

(58) Field of Classification Search
CPC ........................................ G09F 19/14
See application file for complete search history.

(56) References Cited

U.S. PATENT DOCUMENTS

| 5,032,003 A | * | 7/1991 | Antes | ............... | B42D 25/328 |
|---|---|---|---|---|---|
| | | | | | 359/569 |
| 2018/0217307 A1 | * | 8/2018 | Kagotani | ............... | G03B 21/62 |
| 2020/0349872 A1 | * | 11/2020 | Sakurai | ............... | G09F 13/22 |

FOREIGN PATENT DOCUMENTS

| CN | 109691093 A | 4/2019 |
|---|---|---|
| CN | 110419073 A | 11/2019 |

(Continued)

OTHER PUBLICATIONS

International Search Report and Written Opinion issued on Jul. 19, 2022, in corresponding International Application No. PCT/JP2022/021904; 18 pages.

(Continued)

*Primary Examiner* — Edmond C Lau
(74) *Attorney, Agent, or Firm* — Maier & Maier, PLLC

(57) ABSTRACT

A display medium includes a base material that has a three-dimensional shape, and a partition P that is provided on a surface of the base material and has a surface that radially divides a space on the surface of the base material for each of a plurality of directions. A portion that is exposed when observing the display medium from a predetermined direction among the plurality of directions is applied with a color of a content corresponding to the predetermined direction, and the content is image data of a portion where the display medium is provided in a field of view in which a position where the display medium is provided is observed from a visual point in the predetermined direction in a state in which the display medium is not provided.

6 Claims, 18 Drawing Sheets

(56) References Cited

FOREIGN PATENT DOCUMENTS

| | | | | |
|---|---|---|---|---|
| JP | 39-5169 Y1 | 2/1964 | | |
| JP | 52-146592 A | 12/1977 | | |
| JP | 2006343418 A | 12/2006 | | |
| JP | 3203928 U | 4/2016 | | |
| JP | 2016221888 A | 12/2016 | | |
| JP | 6374625 B1 | 8/2018 | | |
| JP | 2019133083 A | * 8/2019 | ............ | G09F 13/14 |
| JP | 2021086147 A | 6/2021 | | |
| KR | 20190081114 A | 7/2019 | | |
| KR | 200492871 Y1 | 12/2020 | | |
| WO | 2017/065289 A1 | 4/2017 | | |

OTHER PUBLICATIONS

Japanese Office Action issued on Sep. 14, 2021, in corresponding application No. 2021-098966; 8 pgs.
Japanese Office Action issued on Nov. 30, 2021, in corresponding application No. 2021-098966; 8 pgs.
Japanese Decision to Grant a Patent issued on Feb. 1, 2022, in corresponding application No. 2021-098966; 7 pgs.
Office Action issued on Jan. 14, 2025, in corresponding Chinese Application No. 202280005588.2; 27 pages.

* cited by examiner

FIG.10
(a)
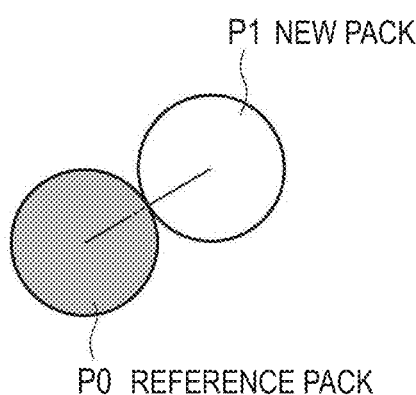
(b)
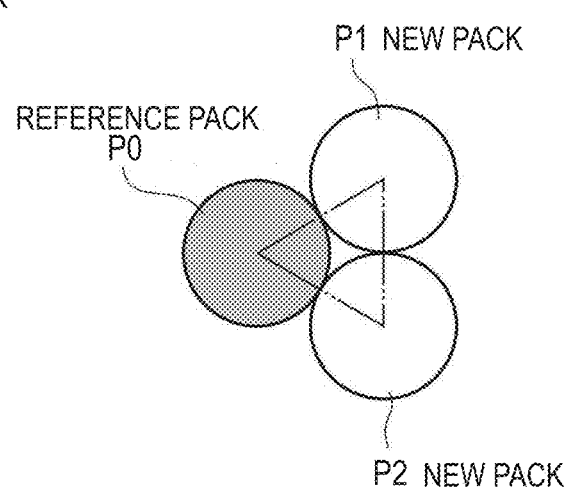
(c)
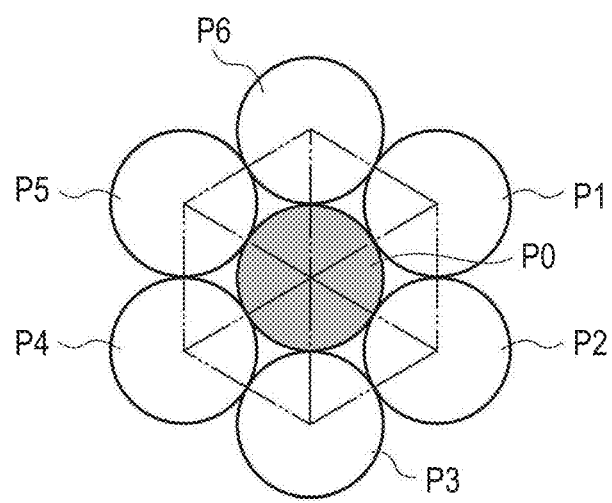

FIG.12
(a)
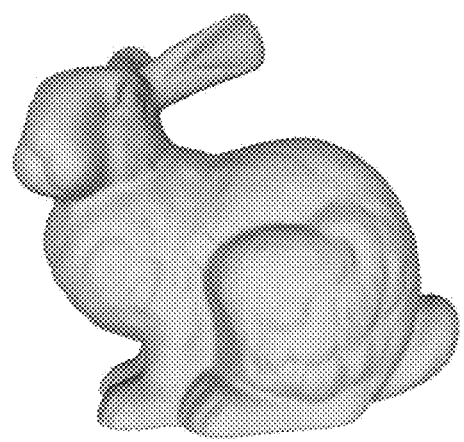
(b)
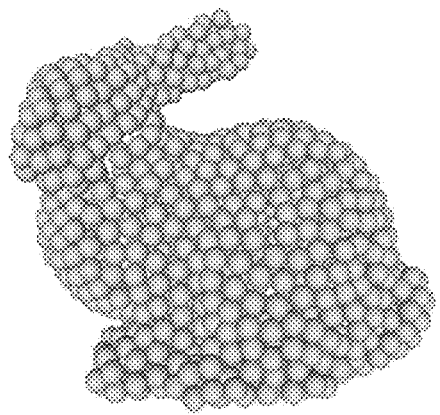

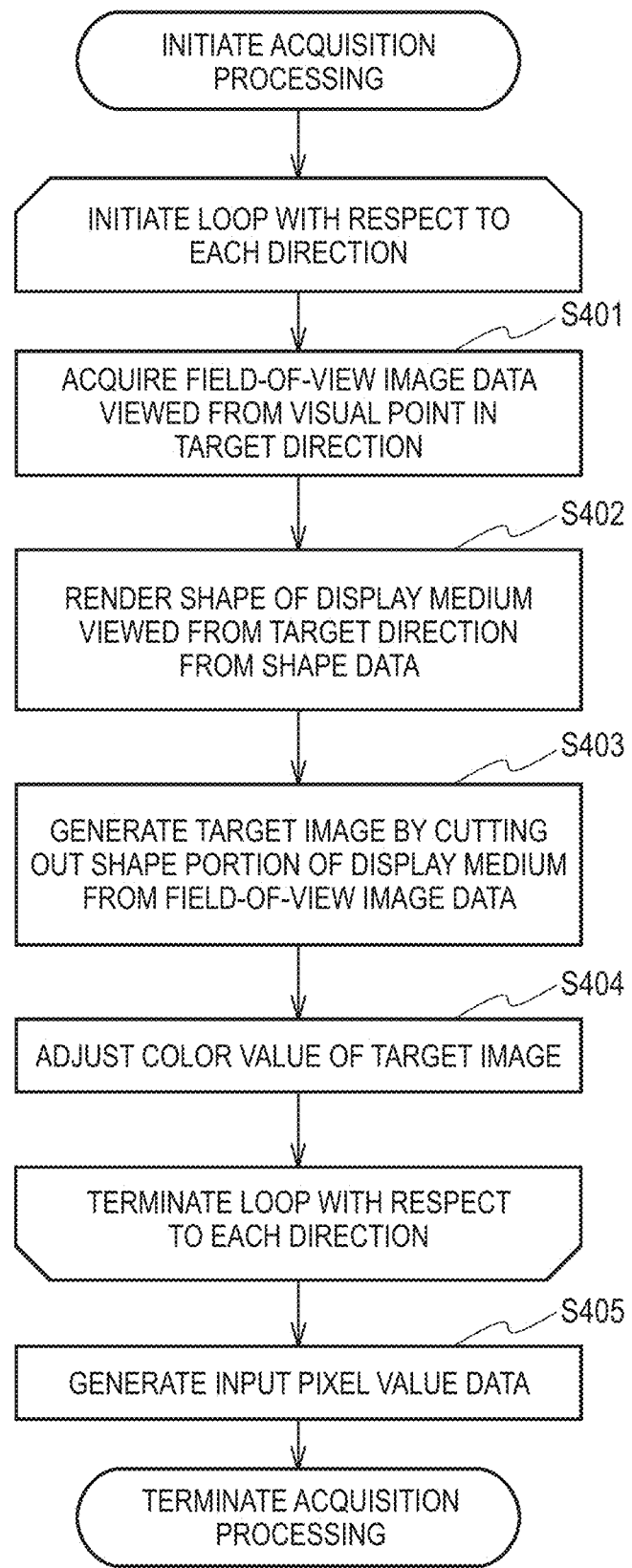

DISPLAY MEDIUM, PROCESSING APPARATUS, PROGRAM, AND COMPUTER-READABLE RECORDING MEDIUM PROVIDED WITH PROGRAM RECORDED THEREON

FIELD

The present invention relates to a display medium, a processing apparatus, a program, and a computer-readable recording medium on which a program is recorded.

BACKGROUND

A display medium that displays different images depending on directions is used in an advertising poster, a card, and the like because the display medium is likely to attract a viewer's attention. In general, a special device and a special base material are required to manufacture the display medium.

There is a display medium capable of displaying a plurality of pieces of information so as to realize efficient information display with the display medium (refer to PTL 1). According to the invention disclosed in PTL 1, a planar member to which a color is applied is divided into a plurality of sub-cells, and a protruding member for causing a color of the sub-cells to be visually recognized is formed in the planar member. The protruding member is formed to be parallel with a designation direction on the planar member and to be perpendicular to the planar member. When observing the display medium from the designation direction, the color applied to the sub-cells parallel to the designation direction is observed from the designation direction.

CITATION LIST

Patent Literature

PTL 1: JP6374625B1

SUMMARY

In the display medium disclosed in PTL 1, since a color of the protruding member is monochromatic, a color gamut is narrow. In addition, since contents are displayed in some of colors provided on the planar member, luminance of respective contents displayed by the display medium may be low. In addition, PTL 1 discloses only a configuration in which the display medium is formed on a plane, and does not disclose a configuration in which the display medium has a three-dimensional shape.

Accordingly, an object of the invention is to provide a technology relating to a display medium having a three-dimensional shape capable of displaying a plurality of contents with a wide color gamut and high luminance.

To solve the problem, according to a first aspect of the invention, there is provided a display medium including: a base material that has a three-dimensional shape; and a partition that is provided on a surface of the base material and has a surface that radially divides a space on the surface of the base material for each of a plurality of directions. A portion that is exposed when observing the display medium from a predetermined direction among the plurality of directions is applied with a color of a content corresponding to the predetermined direction, and the content is image data of a portion where the display medium is provided in a field of view in which a position where the display medium is provided is observed from a visual point in the predetermined direction in a state in which the display medium is not provided.

The partition may have a surface that radially divides the space on the surface of the base material for each direction in which the partition is visually recognized among the plurality of directions.

The partition may be formed in a cell that is provided on the surface of the three-dimensional shape, and a skeleton of the partition may include a part of a Voronoi plane in a Voronoi diagram in which a point that is virtually provided on a line connecting the direction and a point on the cell is set as a generatrix.

According to a second aspect of the invention, there is provided a processing apparatus that calculates a color applied to the display medium according to the first aspect. A surface of the display medium is virtually divided into a plurality of sub-cells, and a sub-cell visually recognized from each of the plurality of directions is specified. The processing apparatus includes: an acquisition unit that acquires each image data of a portion where the display medium is provided in a field of view in which a position where the display medium is provided is observed from each visual point in the plurality of directions in a state in which the display medium is not provided; and a color determination unit that determines a color that is applied to each of the sub-cells so that a color formed by respective colors of the sub-cells visually recognized from each of the plurality of directions approaches a color of a portion of the image data corresponding to each of the plurality of directions.

According to a third aspect of the invention, there is provided a program that calculates a color applied to the display medium according to the first aspect. A surface of the display medium is virtually divided into a plurality of sub-cells, and a sub-cell visually recognized from each of the plurality of directions is specified. The program causes a computer to function as: an acquisition unit that acquires each image data of a portion where the display medium is provided in a field of view in which a position where the display medium is provided is observed from each visual point in the plurality of directions in a state in which the display medium is not provided; and a color determination unit that determines a color that is applied to each of the sub-cells so that a color formed by respective colors of the sub-cells visually recognized from each of the plurality of directions approaches a color of a portion of a content corresponding to each of the plurality of directions.

According to a fourth aspect of the invention, there is provided a processing apparatus that determines positions where a plurality of components are to be provided on a surface of a base material having a three-dimensional shape. The processing apparatus includes: a storage device that stores base material shape data that specifies a shape of the base material, a shape of a plurality of packs including the plurality of components, respectively, and pack data that specifies a reference position provided on a surface of the base material within the packs; a packing unit that disposes a reference position of one pack on the surface of the base material with reference to the base material shape data and the pack data, executes processing of disposing a pack on the surface of the base material so as to come into contact with a reference pack that is the one pack disposed already until it is difficult to dispose a new pack that comes into contact with the reference pack, and repeats the processing until it is difficult to dispose a new pack that comes into contact with a pack disposed already; and a position calculation unit that calculates a position where each of the components is to be provided so that a surface of the component is located at a reference position of the pack in accordance with a position of the pack disposed by the packing unit.

According to a fifth aspect of the invention, there is provided a program that determines positions where a plurality of components are to be provided on a surface of a base material having a three-dimensional shape. The computer program causes a computer to function as: a storage unit that stores base material shape data that specifies a shape of the base material, a shape of a plurality of packs including the plurality of components, respectively, and pack data that specifies a reference position provided on a surface of the base material within the packs; a packing unit that disposes a reference position of one pack on the surface of the base material with reference to the base material shape data and the pack data, executes processing of disposing a pack on the surface of the base material so as to come into contact with a reference pack that is the one pack disposed already until it is difficult to dispose a new pack that comes into contact with the reference pack, and repeats the processing until it is difficult to dispose a new pack that comes into contact with a pack disposed already; and a position calculation unit that calculates a position where each of the components is provided so that a surface of the component is located at a reference position of the pack in accordance with a position of the pack disposed by the packing unit.

According to a sixth aspect of the invention, there is provided a processing apparatus that specifies a shape of a model obtained by adding a plurality of components to a base material. The processing apparatus includes: a storage device that stores shape data that specifies a shape of the base material, component shape data that specifies a shape of each of the components, and component position data that specifies a position in the base material where the component is added; an intersection specifying unit that specifies a component that intersects a shape of another component in a case where the component is added to a position specified by the component position data; and a changing unit that changes a position to which the specified component is added to a position that does not interest the shape of the other component.

In a case where a position to which the specified component is added does not exist, the changing unit may remove the specified component.

The processing apparatus may further include a generation unit that generates shape data of the model by sum-of-sets operation of a shape of the base material, and a position to which each component is added after change by the changing unit and a shape of each component.

According to a seventh aspect of the invention, there is provided a program that specifies a shape of a model obtained by adding a plurality of components to a base material. The program causes a computer to function as: a storage unit that stores shape data that specifies a shape of the base material, component shape data that specifies a shape of each of the components, and component position data that specifies a position in the base material where the component is added; an intersection specifying unit that specifies a component that intersects a shape of another component in a case where the component is added to a position specified by the component position data; and a changing unit that changes a position to which the specified component is added to a position that does not interest the shape of the other component.

According to the invention, it is possible to provide a technology relating to a display medium having a three-dimensional shape capable of displaying a plurality of contents with a wide color gamut and high luminance.

BRIEF DESCRIPTION OF DRAWINGS

FIG. 10 is a view illustrating packing processing according to the embodiment of the invention.

FIG. 12 is a view illustrating a base material having a three-dimensional shape and a state in which the packing processing is performed for the base material in the embodiment of the invention.

FIG. 21 is a flowchart illustrating acquisition processing performed by an acquisition unit according to an application example.

DETAILED DESCRIPTION

Figure 1:
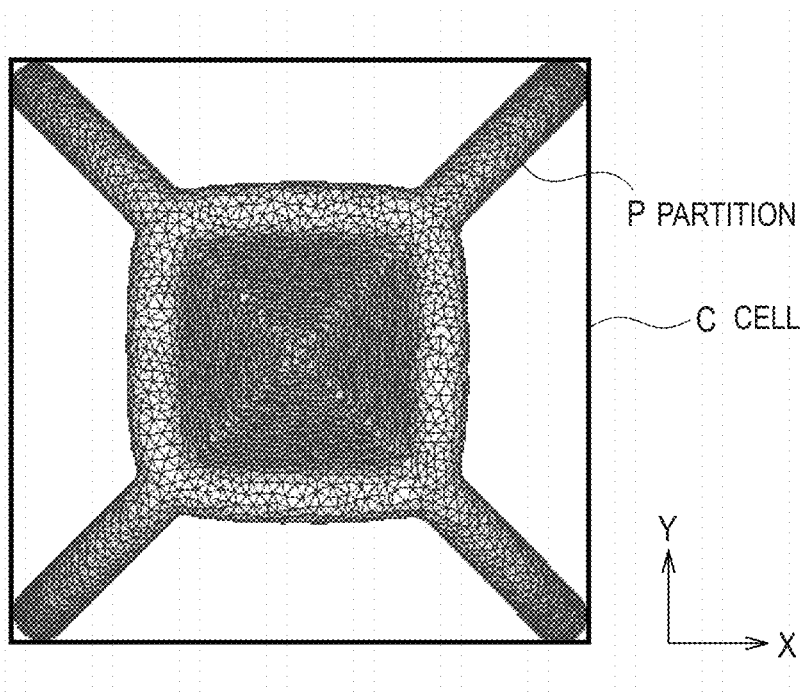
FIG. 1 is a top view of a cell and a partition which are used in a display medium according to an embodiment of the invention.

Next, an embodiment of the invention will be described with reference to the accompanying drawings. In the following description relating to the drawings, the same or similar reference numeral will be given to the same or similar portion.

(Display Medium)

A display medium 1 according to the embodiment of the invention has any three-dimensional shape, and displays contents different from each other in a plurality of directions, respectively. The display medium 1 includes a base material 2 having a three-dimensional shape, and a partition P that has a surface that radially divides a space on a surface of the base material 2 for each of a plurality of directions and is provided on the surface of the base material 2.

The base material 2 of the display medium 1 may have any shape having a three-dimensional shape. For example, as illustrated in FIG. 12(*a*), the base material 2 has a rabbit shape, but there is no limitation to the shape. In the embodiment of the invention, description will be given of a case where the partition P is not provided on the bottom surface so that the display medium 1 can be provided on a stage or the like, but a partition may be provided in a portion that is exposed when visually recognizing the display medium 1.

The display medium 1 is formed in a manner capable of displaying contents different from each other in a plurality of directions, respectively. The display medium 1 can display a different content for every direction when being observed from each predetermined direction.

In the embodiment of the invention, a direction in which the display medium 1 displays a content is referred to as a designation direction. In addition, a direction in which the display medium 1 is visually recognized from a visual point of the designation direction is referred to as a line-of-sight direction. Note that, in the embodiment of the invention, the designation direction in which the content can be displayed may be within a predetermined angle range with respect to the display medium 1.

The content that is displayed in each designation direction by the display medium 1 is any still image. The display medium 1 can display any content for every designation direction. There is no limitation in that a composition is similar between a plurality of contents displayed by the display medium 1, a subject or a part of subject is common, or the like. The display medium 1 can display any content that indicates different meaning for every designation direction. According to this, a user who visually recognizes the display medium 1 can understand different information from each content that is displayed for every designation direction, and thus the display medium 1 can carry a plurality of pieces of information.

In the embodiment of the invention, each content that is displayed in the designation direction is any still image, and a subject is different in each case. In the embodiment of the invention, the subject is a tangible object, a character, a symbol, a digit, or the like which can be displayed by the content, and is a cluster of pixels representing an object. The subject may be displayed to be more clearly in comparison to the background. In the embodiment of the invention, each content that is displayed for every designation direction can include subjects having completely different colors, shapes, or the like without changing or modifying an overlapping manner of a plurality of subjects. In the embodiment of the invention, a content that is displayed in one designation direction can include characters with a plain background, and a content that is displayed in the other designation direction can include a human's mapping with a city background.

Note that, a user who visually recognizes the display medium 1 from a direction away from any designation direction visually recognizes a content different from the content intended by the display medium 1. The content different from the content intended by the display medium 1 is a content that is not intended to make the user understand predetermined information from a display content of the content, and in many cases, it is difficult for the user to understand the meaning of the different content.

When observing the display medium 1 from a space on the display medium 1 while changing a position of a line of sight, the meaning of the content displayed by the display medium 1 can be understood at a certain position or cannot be understood at a certain position. The position at which the meaning can be understood from the content is a position in any one designation direction among a plurality of designation directions assumed by the display medium 1, or a position near any one designation direction.

(Partition)

The partition P provided in the display medium 1 according to the embodiment of the invention will be described with reference to FIG. 1 and FIG. 2. As illustrated in FIG. 1, the partition P is provided in each cell C.

Figure 3:
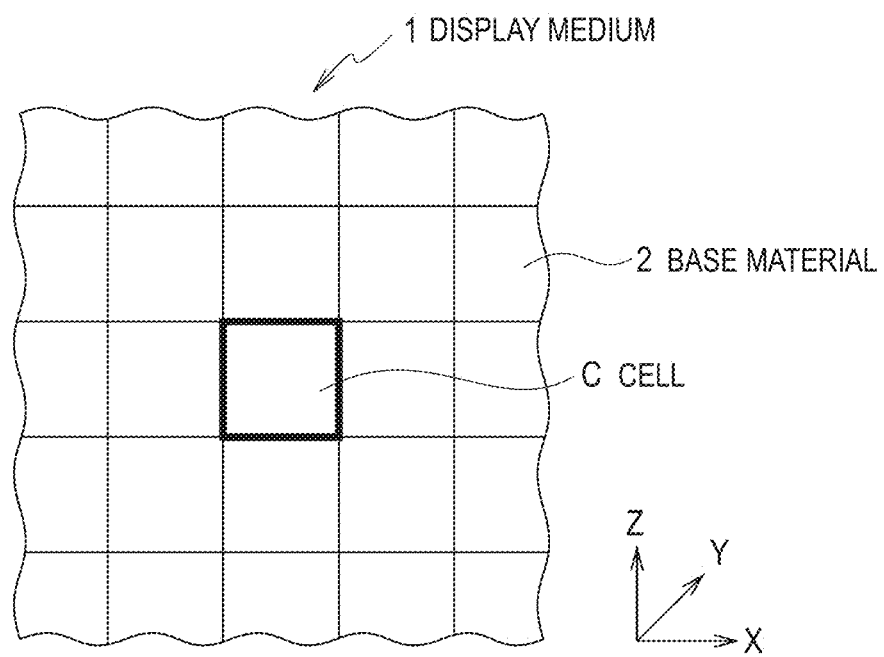
FIG. 3 is a view illustrating cells provided in a base material of the display medium according to the embodiment of the invention.

As illustrated in FIG. 3, the display medium 1 includes the base material 2. The base material 2 may perform diffuse reflection.

In the embodiment of the invention, the base material 2 has a three-dimensional shape, and a plurality of the cells C are formed on a surface of the three-dimensional shape. The cells C may be virtually formed, and adjacent cells C may not be visually distinguished. In the example illustrated in FIG. 3, the surface of the base material 2 is an XY plane, and is provided on an outer side of the base material 2. The surface of the base material 2 may be formed as a plane or a curved surface. In the example illustrated in FIG. 3, each of the cells C has a rectangular shape, but may have any shape such as a circular shape. In addition, in the base material 2, description is given of a case where the cells C are laid over the entire surface, but a region other than cells may be provided between the cells C.

In the embodiment of the invention, a light source is present in all directions. A color applied to the display medium 1 isotropically diffuses in all directions.

Figure 2:
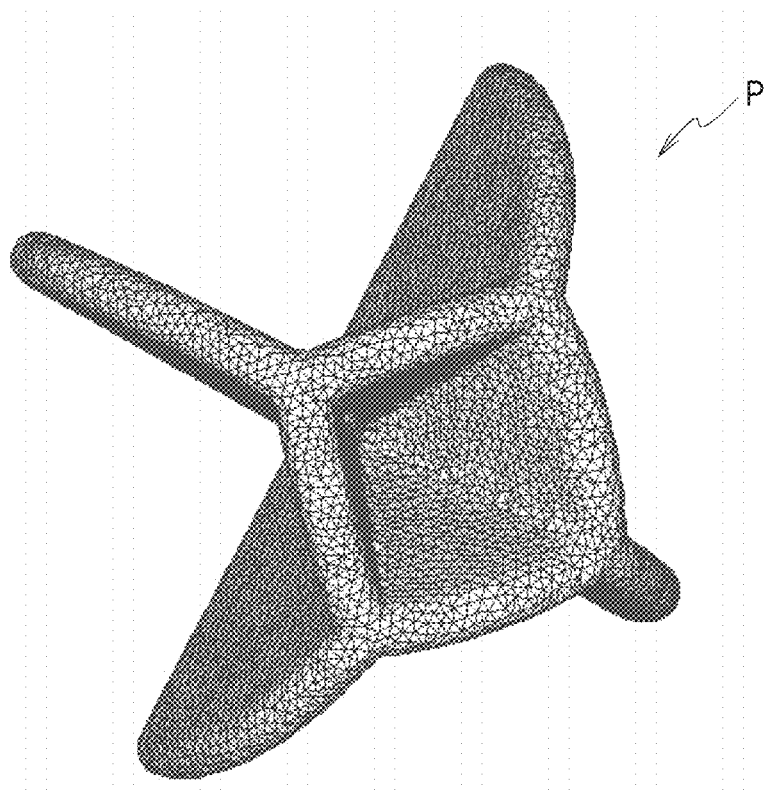
FIG. 2 is a perspective view of the partition according to the embodiment of the invention.

The partition P illustrated in FIG. 1 and FIG. 2 is formed in the cell C formed on the surface of the base material 2 of the display medium 1. A plurality of the partitions P are formed on the surface of the base material 2 of the display medium 1. The partitions P provided in a plurality of the cells C are independently formed on the surface of the base material 2. When observing the display medium 1 from a predetermined designation direction, a content corresponding to a visual point is formed by a color applied to a surface of a partition P facing a line-of-sight direction and a color applied to the surface of the base material 2.

The partition P is formed in the cells C. The partition P is a surface formed on a surface intersecting the surface of the base material 2, and includes a portion that is exposed when observing the display medium 1 from each of a plurality of directions. For example, the base material 2 and the partition P are formed by a member such as an ultraviolet (UV) curing resin containing a pigment and gypsum having a shielding property. In the example illustrated in FIG. 1, the partition P is provided to be in contact with an outer edge of each of the cells C.

Figure 4:
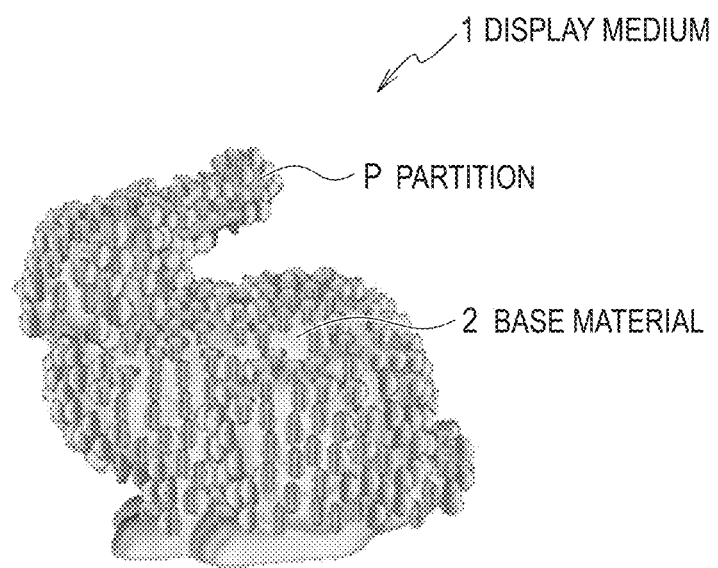
FIG. 4 is a view illustrating an example of the display medium according to the embodiment of the invention.

As illustrated in FIG. 4, the partition P has a convex shape that rises outward with respect to the surface of the base material 2. In addition, the partition P may have a concave shape that is recessed inward with respect to a surface with a tip end of the partition P set as the surface. A color for expressing a content is applied to a surface portion other than a portion where the partition P is in contact with the base material 2. In the display medium 1 according to the embodiment of the invention, since the color of the content is applied in a convex shape with respect to the surface of the base material 2, an area to which the color of the content is applied becomes wider in comparison to a case where the color of the content is applied to only the base material. The display medium 1 provided with the partition P can form a wide area for expressing the content even in a case of displaying a plurality of contents with one medium, and thus a content with a wide color gamut and high luminance can be displayed.

In addition, in the embodiment of the invention, a color for expressing a content is further applied to a surface portion other than a portion, with which the partition P is in contact, in the surface of the base material 2. According to this, a wide area for expressing each content can be formed.

As illustrated in FIG. 1 and FIG. 2, the partition P has a plurality of surfaces. The partition P has one or more surfaces with respect to one designation direction of the display medium 1. The surfaces face a line-of-sight direction in which the display medium 1 is visually recognized from a visual point in the one designation direction, and are exposed when the display medium 1 is visually recognized from the visual point. A color of a content corresponding to the designation direction is expressed on a surface exposed with respect to the designation direction.

More specifically, in the surface of the partition P, a portion that is exposed when observing the display medium 1 from a predetermined direction among a plurality of directions is applied with a color of a content corresponding to the predetermined direction. With respect to each designation direction of the display medium 1, a part of the surface of the partition P is exposed with respect to the designation direction when observing the display medium 1 from the designation direction, and a color of a content corresponding to the designation direction is applied to the exposed portion. According to this, the partition P has a plurality of surfaces, and thus a part of a content corresponding to each designation direction can be expressed with respect to a plurality of designation directions.

In the embodiment of the invention, the partition P has a surface that radially divides a space on the surface of the base material 2 for every direction in which the partition is visually recognized among a plurality of directions. In the embodiment of the invention, since the display medium 1 has a three-dimensional shape, a restriction occurs in a direction in which the partition P is visually recognized due to a position where the partition P is provided. In an example illustrated in FIG. 12(a), one point on the head of a rabbit can be visually recognized on a side surface or a top surface, but one point on the body of the rabbit cannot be visually recognized from a side opposite to the point. Therefore, the partition P is formed to have a surface for expressing a content with respect to a direction in which the partition P can be visually recognized for every position where the partition P is provided.

Note that, the portion that is exposed to a predetermined designation direction may also be exposed toward another designation direction. In this manner, a portion that is exposed with respect to a plurality of designation direction is applied with a color that is suitable for a plurality of contents corresponding to the plurality of designation directions.

Colors of five contents with respect to five designation direction are applied to the partition P illustrated in FIG. 1 and FIG. 2. The five designation directions include a direction with an azimuth angle of 0° and an elevation angle of 45°, a direction with an azimuth angle of 90° and an elevation angle of 45°, a direction with an azimuth angle of 180° and an elevation angle of 45°, and a direction with an azimuth angle of 270° and an elevation angle of 45° in addition to a normal direction with respect to the base material 2 of the cell C. Here, the azimuth angle represents a direction on an XY plane of the base material 2 of the cell C, and the elevation angle represents an angle made between the XY plane of the base material 2 of the cell C and a line of sight from the XY plane to any point in a Z-direction.

In the example illustrated in FIG. 1 and FIG. 2, the partition P has sixteen triangular surfaces facing a plurality of lines of sight. The partition P has four triangular surfaces with respect to a normal direction to the base material 2 of the cell C. A part of a content corresponding to the normal direction is expressed by the four surfaces. In addition, the partition P has three triangular surfaces with respect to each of four directions other than the normal direction. A part of a content corresponding to each direction is expressed by the three surfaces.

The shape of the partition P will be described with reference to FIG. 5. In the embodiment of the invention, a Voronoi diagram with respect to a generatrix that is virtually provided in a designation direction is virtually formed. A skeleton of the partition P includes a part of a Voronoi plane in the Voronoi diagram in which a point that is virtually provided on a line connecting the designation direction and a point on the cell C is set as the generatrix. The partition P is fleshed out to the Voronoi plane that is the skeleton. A surface of the partition P includes a plane parallel to the Voronoi plane.

Figure 5:
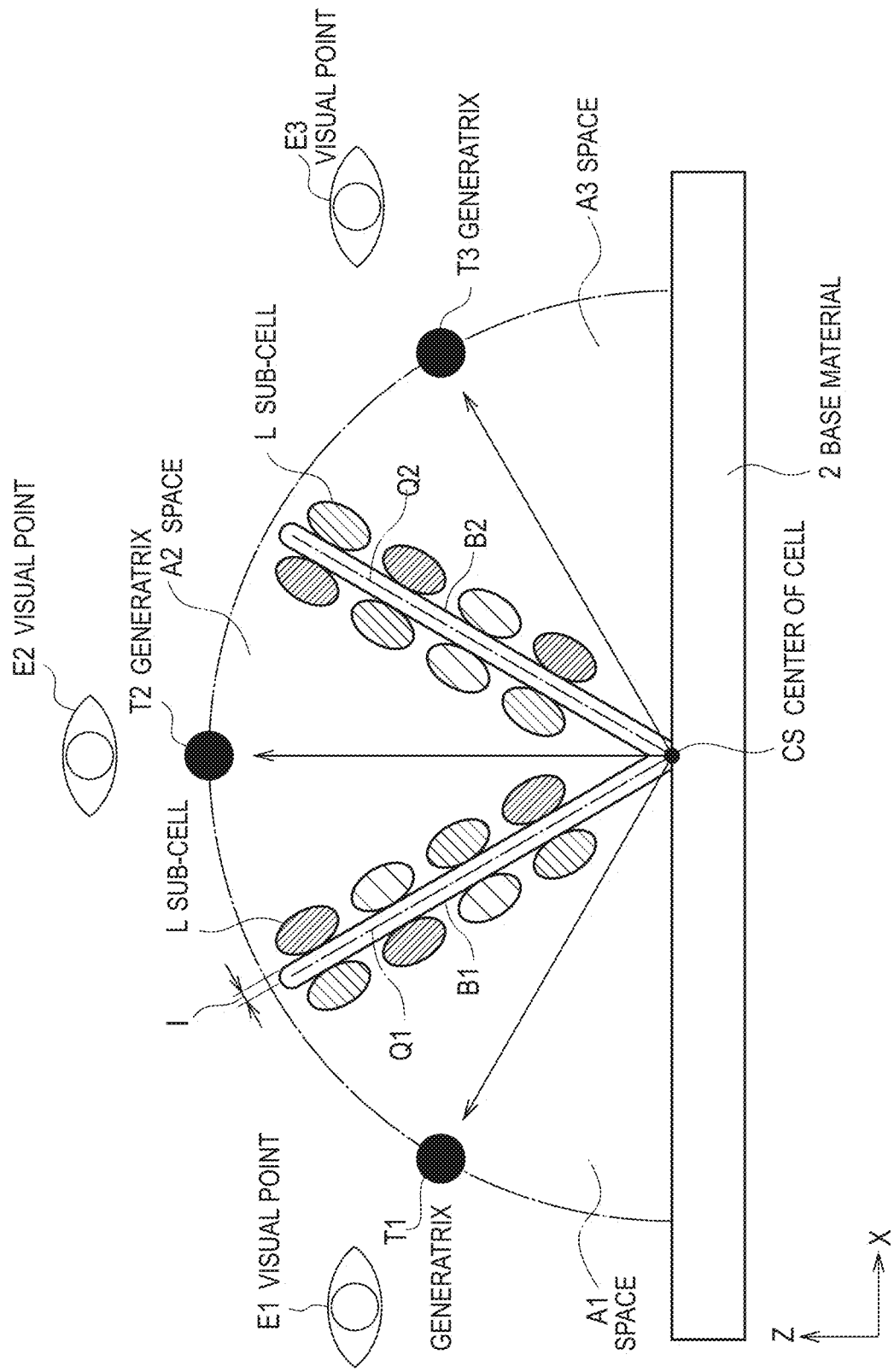
FIG. 5 is a view illustrating the partition according to the embodiment of the invention.

In the example illustrated in FIG. 5, three visual points E1, E2, and E3 are provided. Generatrices T1, T2, and T3 are provided on a line of sight when visually recognizing the center Cs of the cell C from the respective visual points E1, E2, and E3. The generatrices T1, T2, and T3 are provided on a virtual sphere having a predetermined radius centered on the center Cs of the cell C.

The partition P includes one or more shielding members B. Each of the shielding members B is fleshed out to the Voronoi plane set as a skeleton. The shielding member B divides a space on the cell C provided with the partition P into regions for every designation direction.

In the example illustrated in FIG. 5, the partition P includes shielding members B1 and B2. The shielding member B1 is fleshed out to a Voronoi plane Q1 set as a skeleton in a thickness I. The shielding member B2 is fleshed out to a Voronoi plane Q2 set as a skeleton in a thickness I. In addition, a tip end of the shielding member B1 is formed in a circular shape having a radius I.

The shielding member B1 divides the space on the cell C into a space A1 corresponding to the visual point E1 and a space A2 corresponding to the visual point E2. The shielding member B2 divides the space on the cell C into the space A2 corresponding to the visual point E2 and a space A3 corresponding to the visual point E3.

In the surface of the partition P, a portion that is exposed when observing the display medium 1 from a predetermined designation direction among a plurality of designation directions includes a portion that is shielded when observing the display medium 1 from directions other than the predetermined designation direction among the plurality of designation directions. Even when being exposed with respect to one or more predetermined designation directions, the surface of the partition P may not be seen from the other designation directions. The surface of the partition P expresses a color of a content corresponding to a designation direction in which the surface is exposed. According to this, the display medium 1 can express a part of another content with respect to a plurality of designation directions, and thus a plurality of contents with a wide color gamut and high luminance can be displayed.

In the example illustrated in FIG. 5, a surface of the shielding member B1 on the space A1 side can be visually recognized from the visual point E1, but has a portion that cannot be visually recognized from the visual point E2 or the visual point E3. A surface of the shielding member B1 on the space A2 side can be visually recognized from the visual point E2, but has a portion that cannot be visually recognized from the visual point E1 or the visual point E3. A surface of the shielding member B2 on the space A2 side can be visually recognized from the visual point E2, but has a portion that cannot be visually recognized from the visual point E1 or the visual point E3. A surface of the shielding member B2 on the space A3 side can be visually recognized from the visual point E3, but has a portion that cannot be visually recognized from the visual point E1 or the visual point E2.

Each surface of the partition P is formed to be likely to be visually recognized from a designation direction, and to be less likely to be visually recognized from the other designation directions. In each surface of the partition P, an effect of emitting a color that forms a content with respect to the designation direction, and an effect of shielding light from directions other than the designation direction are satisfied. According to this, the display medium 1 can display any another content with respect to each designation direction. In addition, the display medium 1 can display a content with a wide color gamut and high luminance with respect to each designation direction. Since each surface of the partition P is suppressed from an influence of a line of sight from directions other than the designation direction, a color suitable for a surface observed from the designation direction can be applied to the surface.

In the embodiment of the invention, the skeleton of the partition P is formed on the Voronoi plane formed with respect to the generatrix. The Voronoi plane is formed to pass through the center between adjacent generatrices among respective generatrices, and to shield a line of sight from each of the generatrices. The surface of the partition P is formed to have a predetermined thickness with respect to the Voronoi plane formed as described above.

When a color is applied to the surface of the partition P formed as described above, a color of a content can be applied to a wide surface, and thus visibility (luminance) of the content can be improved.

Note that, in the embodiment of the invention, the display medium 1 is formed by a 3D printer. Accordingly, a shape and accuracy of the partition P depend on the performance of the 3D printer that forms a partition. For example, when forming the partition P in a small thickness with respect to the Voronoi plane within a range of the performance of the 3D printer, visibility from the designation direction can be improved.

An example of the content that is displayed by the display medium 1 according to the embodiment of the invention will be described with reference to FIG. 6 and FIG. 7. In the example illustrated in FIG. 6 and FIG. 7, different contents are displayed in totally nine directions including eight directions (an elevation angle is 0°) in which an azimuth angle of a side surface on the XY plane is deviated by 45° in the display medium 1 illustrated in FIG. 4, and one direction (an elevation angle is 90°) from a top surface (Z-axis). The display medium 1 illustrated in FIG. 7 is formed by the 3D printer.

Figure 6:
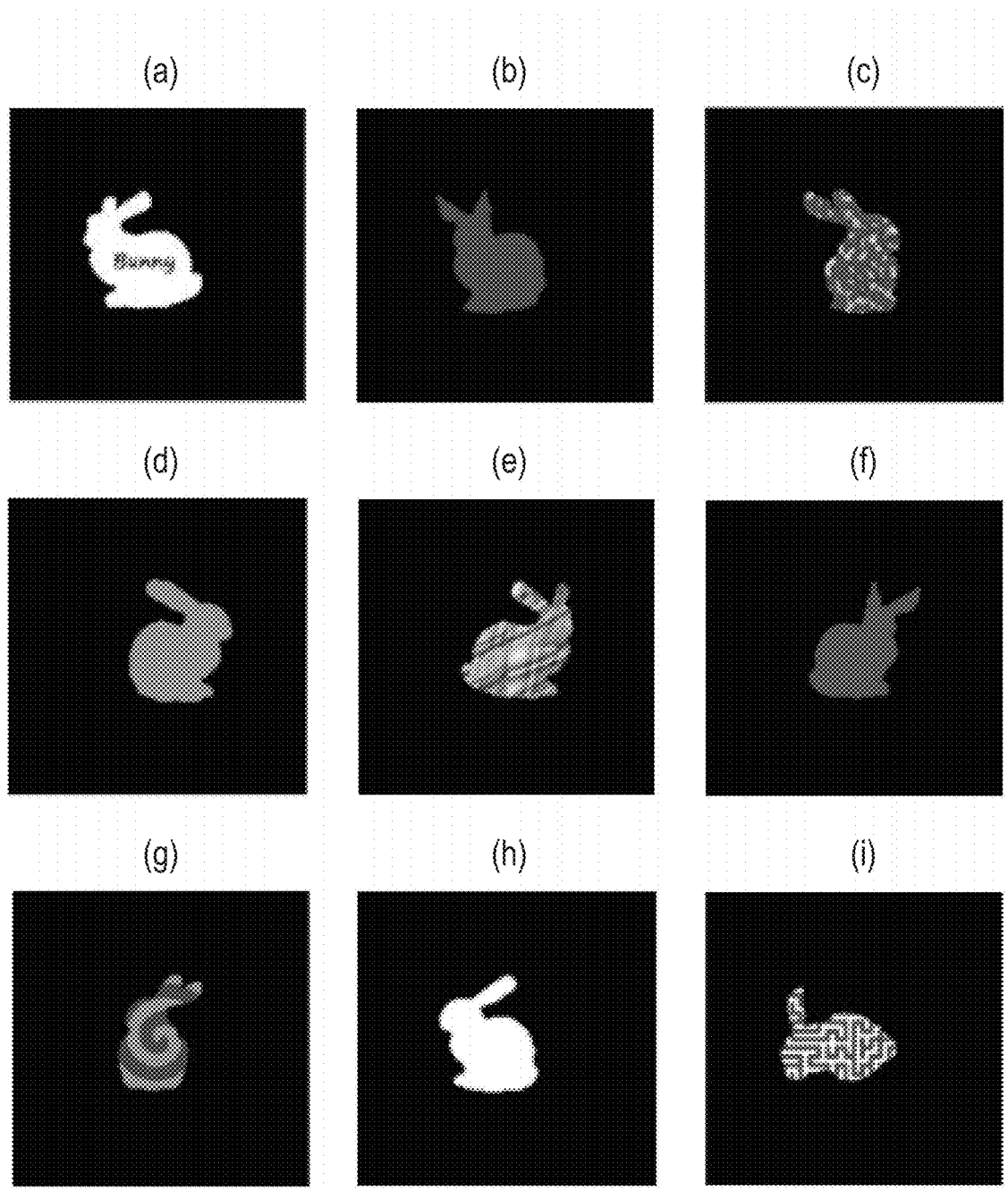
FIG. 6 is a view illustrating an example of a target image displayed in each direction by the display medium according to the embodiment of the invention.

FIG. 6 illustrates target images to be displayed in respective directions by the display medium 1. Respective drawings in FIG. 6(*a*) to FIG. 6(*h*) are target images to be displayed in eight directions different in the azimuth angle of the side surface on the XY plane. FIG. 6(*i*) is a target image to be displayed with respect to the top surface.

Figure 7:
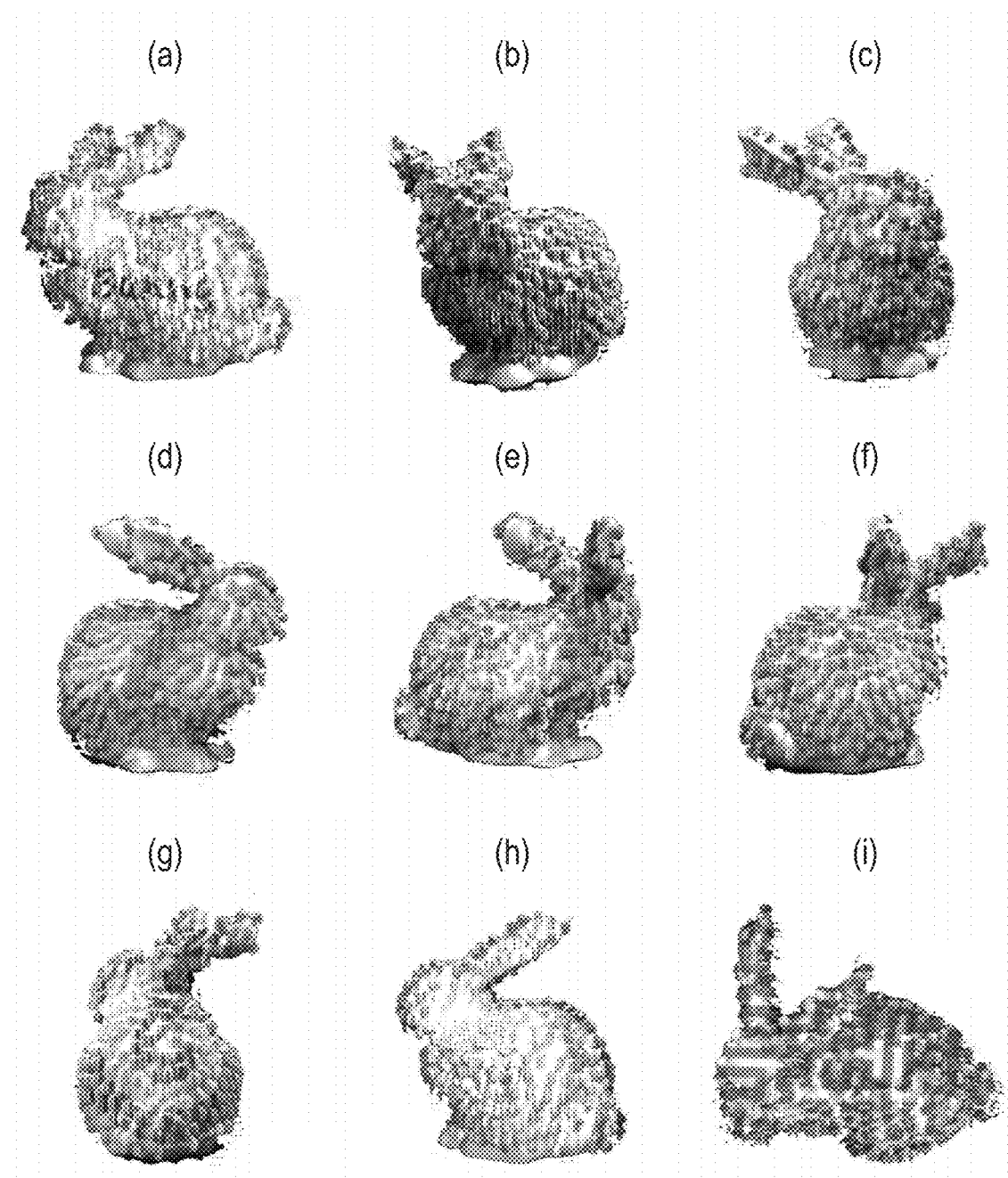
FIG. 7 is a view illustrating an example of output images displayed in respective directions by the display medium according to the embodiment of the invention.

FIG. 7 illustrates contents displayed in respective directions by the display medium 1. Respective drawings in FIG. 7(*a*) to FIG. 7(*h*) are contents to be displayed with respective eight directions different in the azimuth angle of the side surface on the XY plane, and correspond to FIG. 6(*a*) to FIG. 6(*h*). FIG. 7(*i*) is a content to be displayed with respect to the top surface, and corresponds to FIG. 6(*i*). It can be seen that the respective drawings in FIG. 7 can express characteristics of the respective drawings in FIG. 6, respectively, and contents different from each other can be displayed with respect to the nine directions by one piece of the display medium 1.

Note that, in the example illustrated in FIG. 7, a partition P provided in the vicinity of the head, the backbone, or the like of a rabbit may have a surface in all of the nine designation directions. On the other hand, a partition P provided on a side surface of the rabbit may have a surface, for example, in three or four directions less than the nine directions.

In the embodiment of the invention, the partition P has a surface to be exposed with respect to each of a plurality of directions. In addition, with regard to the surface to be exposed, the space on the surface of the base material 2 is radially divided for each of the plurality of directions. Accordingly, even when display directions of the display medium 1 increase, an area of the surface to be exposed can be maintained, and thus a plurality of contents with a wide color gamut and high luminance can be displayed.

(Processing Apparatus)

A processing apparatus 3 according to the embodiment of the invention will be described with reference to FIG. 8. The processing apparatus 3 calculates a position and a shape of the partition P so as to display a content in a designation direction. In addition, the processing apparatus 3 calculates a color of each sub-cell L of the display medium 1 so that an output image (content) to be displayed in each designation direction approaches a desired target image.

The processing apparatus 3 calculates a Voronoi plane with respect to a generatrix in a designation direction, specifies a position and a shape of the partition P centered on the Voronoi plane, and specifies a shape of the display medium 1. The processing apparatus 3 divides a surface of the display medium 1 into a plurality of sub-cells L, and determines whether or not to be seen from each designation direction with respect to the sub-cells L. The processing apparatus 3 optimizes a color of each of the sub-cells L so that a content corresponding to each designation direction can be displayed in a color applied to a sub-cell L that is seen from each designation direction.

Note that, in the embodiment of the invention, description is given of a case where the processing apparatus 3 calculates the position and the shape of the partition P and the color of the sub-cell L, but there is no limitation to the case. For example, the position and the shape of the partition P and the color of the sub-cell L may be calculated by hand calculation. In addition, the position and the shape of the partition P may be designed by using a tool such as a ruler and a compass.

The processing apparatus 3 is a general computer that includes a storage device 10, a processing control device 20, and an input/output interface 30. When a general computer executes a processing program, a function illustrated in FIG. 8 is realized.

The storage device 10 is a read only memory (ROM), a random access memory (RAM), a hard disk, or the like, and stores various pieces of data such as input data for execution of processing by the processing control device 20, output data, and intermediate data. The processing control device 20 is a central processing unit (CPU) that reads and writes data stored in the storage device 10, inputs and outputs data to and from the input/output interface 30, and executes processing in the processing apparatus 3.

The input/output interface 30 is an interface with an output device for inputting/outputting data to and from the processing control device 20. The input/output interface 30 in the embodiment of the invention outputs a shape of the partition P and a color of the sub-cell L on the partition P to a manufacturing device of the partition P. The manufacturing device forms the partition P on the basis of an input position and an input shape of the partition P, and a color of the display medium 1.

In the embodiment of the invention, the manufacturing device is a 3D printer. Note that, data of the shape of the display medium 1 and the color of the sub-cell L on the display medium 1 may be input to the manufacturing device from the processing apparatus 3 through a communication network, a communication cable, or the like. The data relating to the display medium 1 may be input to the manufacturing device through a storage medium such as a universal serial bus (USB) memory. In the embodiment of the invention, description is given of a case where the 3D printer performs formation and coloring of the display medium 1, but there is no limitation to the case. For example, formation and coloring of the display medium 1 may be performed by different devices, respectively.

The storage device 10 stores a processing program, and stores condition data 11, shape data 12, input pixel value data 13, and color value data 14. The condition data 11 and the input pixel value data 13 are given in advance prior to processing by the processing control device 20. The processing program may be stored in a computer-readable recording medium such as an HDD, an SSD, a universal serial bus (USB) memory, a compact disc (CD), and a digital versatile disc (DVD), or may be transmitted through a network.

The condition data 11 includes data of a shape of the base material 2, and data of conditions required to determine a shape and a color of the partition P. Examples of the conditions include designation directions, the number of the designation directions, the shape and the position of the cell C of the display medium 1, and the like.

The shape data 12 is data that specifies the shape of the display medium 1. The shape data 12 may be generated in a format that is readable by the manufacturing device.

The input pixel value data 13 is target image data of an output image that is output with respect to each direction by the display medium 1. The input pixel value data 13 specifies a color value corresponding to each cell formed on the display medium 1 for every designation direction. For example, the input pixel value data 13 has a color value for every section having a similar arrangement as in each cell of the display medium 1. Examples of the color value include respective values of three primary colors of RGB.

The color value data 14 specifies color values applied to respective sub-cells L of the display medium 1. For example, the color values are respective values of three primary colors of RGB as in the input pixel value data 13.

The processing control device 20 includes a shape specifying unit 21, a shape output unit 22, a color determination unit 23, and an output unit 24.

The shape specifying unit 21 calculates a position and a shape of the partition P, and specifies the shape of the display medium 1. The shape specifying unit 21 stores the shape data 12 that specifies the specified shape of the display medium 1 in the storage device 10. The shape specifying unit 21 specifies the shape of the display medium 1 in accordance with the performance of the manufacturing device that forms the display medium 1.

The shape output unit 22 outputs the shape data 12 generated by the shape specifying unit 21 to the manufacturing device through the input/output interface 30. The manufacturing device forms the display medium 1 on the basis of the shape data 12 that is input.

The color determination unit 23 determines colors of respective sub-cell L provided on the surface of the display medium 1 from the input pixel value data 13, generates the color value data 14, and stores the color value data 14 in the storage device 10.

The output unit 24 outputs the color value data 14 generated by the color determination unit 23 to the manufacturing device through the input/output interface 30.

The manufacturing device colors the sub-cells L of the display medium 1 on the basis of the color value data 14 that is input.

(Shape Specifying Unit)

The shape specifying unit 21 densely arranges packs including the partition P on the surface of the display medium 1, and calculates a position of the partition P. With respect to each partition P, the shape specifying unit 21 calculates the shape of the partition P to have a surface that radially divides a space on the surface of the base material 2 for every direction in which the partition P is visually recognized. For example, first, the shape specifying unit 21 calculates a Voronoi plane with respect to a generatrix provided in each designation direction. In addition, the shape specifying unit 21 calculates a shape provided in a predetermined thickness with respect to the calculated Voronoi plane as the shape of the partition P. When a position where each partition P is to be provided, and the shape of the partition P are specified, the shape specifying unit 21 updates the position of the partition P so that a plurality of the partitions P do not intersect each other. A sum of sets is calculated from the position of each of the partitions P after updating, the shape of the partition P, and the shape of the base material 2, the shape data 12 that specifies the shape of the display medium 1 is generated, and stores the shape data 12 in the storage device 10.

In the embodiment of the invention, description is given of a case where the position and the shape of the partition P provided in the display medium 1 are specified, but the display medium 1 and the partition P may be substituted with a typical model and a typical component. For example, the shape specifying unit 21 may be applied to a case of specifying a shape of a model obtained by adding a plurality of components to the base material 2. The model may be a typical tangible object, or may be an object that is used in computer processing such as input to the 3D printer.

Figure 9:
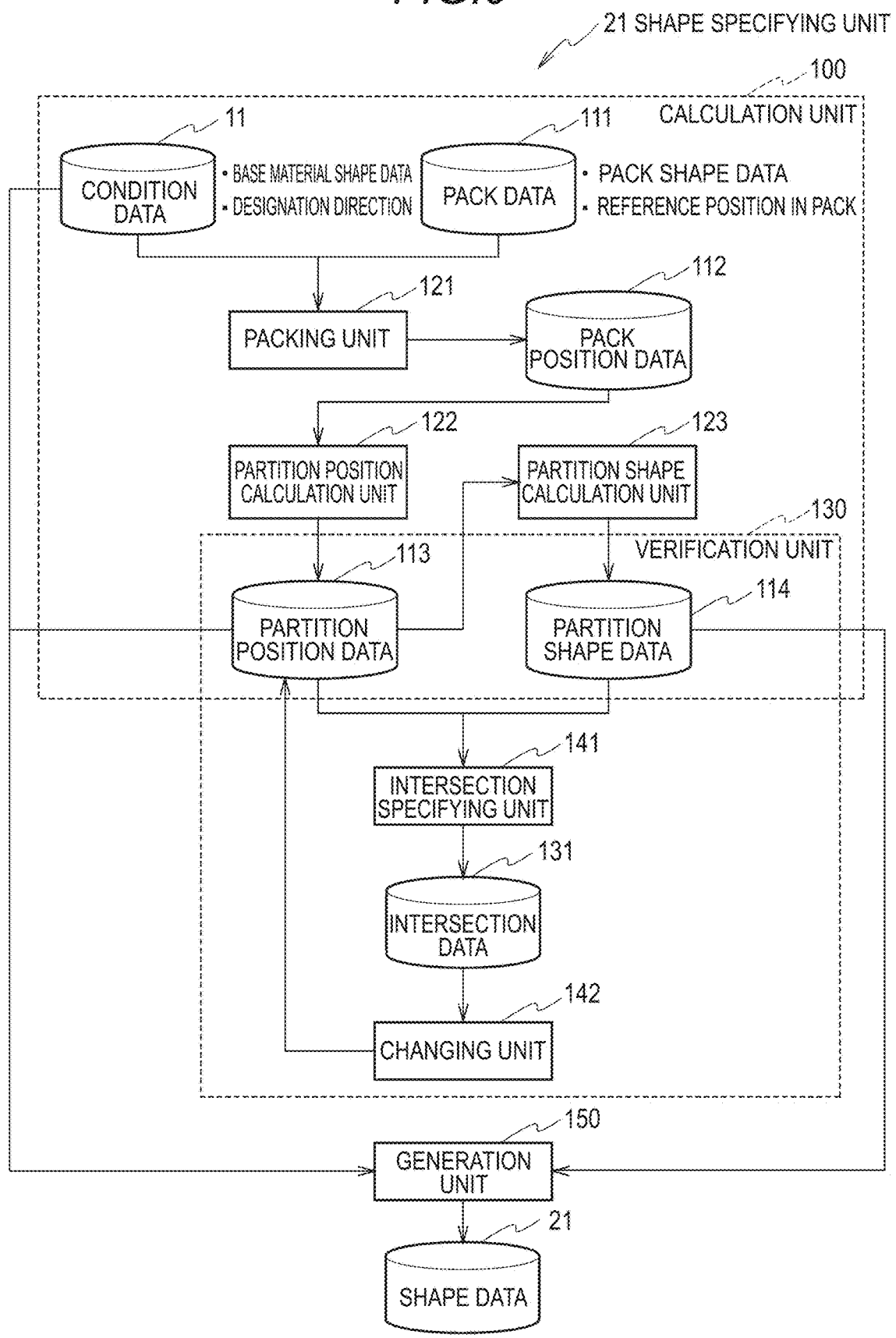
FIG. 9 is a view illustrating a functional block of a shape specifying unit of the processing apparatus according to the embodiment of the invention.

The shape specifying unit 21 will be described with reference to FIG. 9. The shape specifying unit 21 includes a calculation unit 100, a verification unit 130, and a generation unit 150.

(Calculation Unit)

The calculation unit 100 calculates positions where a plurality of the partitions P (components) are to be provided on the surface of the base material 2 having a three-dimensional shape, and a shape of each of the partitions P.

In order for the display medium 1 to display a content with a wide color gamut and high luminance, it is preferable to provide more partitions P on the surface of the base material 2. On the other hand, in a case where the partitions P intersect each other, the following problems and the like occur. Specifically, a color of one partition P is not seen due to a shadow of the other partition P, the shape of the display medium 1 cannot be specified, and the display medium 1 cannot be generated by the 3D printer.

Here, the calculation unit 100 calculates positions where the partitions P are arranged so that the partitions P as much as possible do not overlap each other when viewed from respective visual-point directions. In the embodiment of the invention, the partitions P are densely arranged by repeating a step of locally and densely arranging the partitions P (by densely arranging partitions P around one partition P) instead of entirely and densely arranging the partitions P (instead of calculating an optimal solution for densely arranging the partitions over the entirety of the surface of the base material). In a case of entirely and densely arranging the partitions, a significant calculation cost may be required, and thus the step of locally and densely arranging the partitions is repeated to reduce the calculation load.

When determining the arrangement of the partitions P, the calculation unit 100 defines packs including the partitions P, and the packs are densely arranged. According to this, the partitions P can be densely arranged. Note that, the packs defined here may encompass the maximum volume of the partitions P defined by specifications and the like. As illustrated in FIG. 5, the partitions P are formed within a sphere having a radius r, and thus the packs also have a spherical shape having a radius r.

After arranging packs on the surface of the base material 2, the calculation unit 100 specifies a position of each of the partitions P disposed within the packs. In correspondence with the position of the partition P, the calculation unit 100 specifies a shape of the partition P to have a Voronoi plane with respect to each designation direction in which the position is visually recognized.

The calculation unit 100 includes condition data 11, pack data 111, pack position data 112, partition position data 113, partition shape data 114, a packing unit 121, a partition position calculation unit 122, and a partition shape calculation unit 123.

As described above with reference to FIG. 8, the condition data 11 includes data (base material shape data) that specifies the shape of the base material 2, and data of conditions such as a designation direction required to determine a shape and a color of the partition P.

The pack data 111 specifies a shape of a plurality of packs including a plurality of the partitions P (components), respectively, and a reference position provided on the surface of the base material 2 within each of the packs. The reference position is a position that serves as a reference when disposing the packs in the base material, and the packs are disposed so that the reference position is on the surface of the base material 2.

Here, the packs may have a shape including the partitions P, but it is preferable that the partitions P are in contact with each other for more dense arrangement. In the embodiment, the partitions P are formed within a virtual sphere having a radius r centered on the center Cs of the cell C illustrated in FIG. 5, and the packs have a spherical shape having a radius r. Note that, in the embodiment of the invention, the packs have a spherical shape, but may have a shape in which a dent does not exist on a surface of a convex shell or the like. Even through a dent exists on the surface of the packs, another pack may be controlled so as not to come into contact with the dent, and a dent may be allowed for the shape of the packs.

The pack position data 112 is data that specifies a position of each of the packs disposed on the surface of the base material 2 in accordance with processing results by the packing unit 121. For example, the pack position data 112 includes a position of the surface of the base material 2 where a reference position of the pack is disposed.

The partition position data 113 is data that specifies a position of each of the partitions P by a processing result in the partition position calculation unit 122. The partition position data 113 includes a position of the surface of the base material 2 where the reference position of the partition P such as the center Cs of the cell C is disposed.

The partition shape data 114 is data that specifies a shape of the partition P by a processing result in the partition shape calculation unit 123. For every designation direction in which a position where the partition P is provided can be visually recognized, the partition shape data 114 includes a surface that can be visually recognized from the designation direction and is less likely to be visually recognized from the other designation directions. For example, the surface is defined as a Voronoi plane.

The packing unit 121 disposes a reference position of one pack on the surface of the base material 2 with reference to the base material shape data of the condition data 11 and the pack data 111. The packing unit 121 executes processing of disposing a pack on the surface of the base material so as to come into contact with a reference pack that is one pack disposed already until it is difficult to dispose a new pack that comes into contact with the reference pack. The packing unit 121 changes the reference pack, and repeats the processing until it is difficult to dispose a new pack that comes into contact with a pack disposed already.

When it is difficult to dispose a new pack that comes into contact with a pack disposed already, the packing unit 121 generates the pack position data 112 including a position of each pack disposed on the base material 2.

Note that, the packing unit 121 does not arrange an actual pack and an actual base material, and performs calculation for arranging a pack object and a base material object as computer processing so as to determine a position of the partition P.

As illustrated in FIG. 10(a), the packing unit 121 disposes a reference pack P0 on the surface of the base material 2. The packing unit 121 disposes a new pack P1 to come into contact with the reference pack P0. At this time, a reference position of the reference pack P0 and the new pack P1 is located on the surface of the base material 2. The pack does not intersect another pack, but a surface of the pack and the surface of the base material are disposed to intersect each other.

As illustrated in FIG. 10(b), the packing unit 121 disposes a new pack P2 to come into contact with the reference pack P0 and the new pack P1. A reference position of the new pack P2 is located on the surface of the base material 2. In addition, when the packing unit 121 repeats processing of disposing new packs P3 to P6 to come into contact with the reference pack P0 and a pack disposed already, an arrangement illustrated in FIG. 10(c) is obtained.

In FIG. 10(c), it is difficult to dispose a new pack that comes into contact with the reference pack P0, and thus a pack (for example, the pack P1) other than the reference pack P0 is set as a new reference pack, and a new pack is disposed to come into contact with the pack P1 and an existing pack (here, P2 or P6).

Note that, the example illustrated in FIG. 10 corresponds to a case where the surface of the base material 2 is a plane. In a case where the surface of the base material 2 is a curved surface, the number of packs capable of being disposed around the reference pack P0 is five or less.

As described above, when disposing a pack to come into contact with an existing pack, it is possible to locally and densely arrange respective packs, and it is possible to densely arrange packs on the entirety of the base material 2 without a calculation cost.

Figure 11:
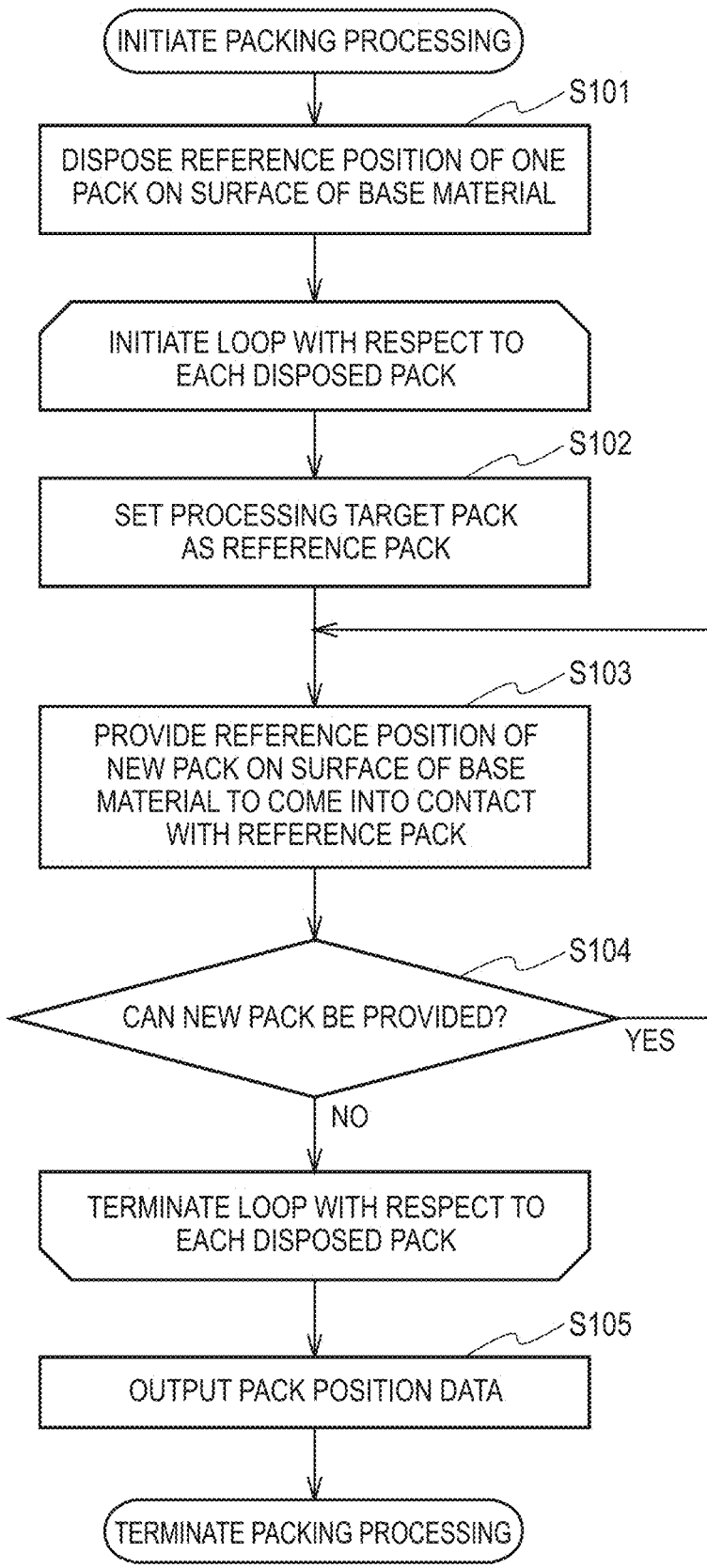
FIG. 11 is a flowchart illustrating the packing processing according to the embodiment of the invention.

The packing processing by the packing unit 121 will be described with reference to FIG. 11.

First, in step S101, the packing unit 121 disposes a reference position of one pack on the surface of the base material 2.

With respect to respective packs disposed already, processing in step S102 to step S104 is repeated.

In step S102, the packing unit 121 defines one pack disposed already as a reference pack. In step S103, a reference position of a new pack is provided on the surface of the base material 2 to come into contact with the reference pack. In step S104, the packing unit 121 determines whether or not a new pack can be provided to come into contact with the reference pack defined in step S102. In a case where the new pack can be provided, the new pack is provided in step S103. In a case where the new pack cannot be provided, the packing unit 121 defines a new reference pack in step S102, and performs processing in step S103 to step S104.

The processing in step S102 to step S104 is performed with respect to respective packs disposed already, and in a case where a new pack cannot be disposed with respect to the respective packs disposed already, the process proceeds to step S105. In step S105, the packing unit 121 outputs the pack position data 112 including positions of respective packs disposed in step S103.

When the packing unit 121 generates the pack position data 112, the partition position calculation unit 122 specifies a position of the partition P (component) with reference to the pack position data.

The partition position calculation unit 122 calculates a position of the partition P in each of the packs, and generates the partition position data 113. The partition position calculation unit 122 calculates a position where the partition P (component) is to be provided so that a surface of the partition P is located at the reference position of the pack in accordance with a position of the pack disposed by the packing unit 121. In the embodiment of the invention, the pack encompasses a maximum volume of the partition P, and thus the position of the pack is specified as the position of the partition P. More specifically, the partition position calculation unit 122 calculates the position of the partition P so that an intersection between respective Voronoi planes of the partition P in FIG. 5 becomes a reference position of packs.

A state in which packs are disposed on the surface of the base material 2 is illustrated with reference to FIG. 12. FIG. 12(a) illustrates a shape of the base material 2, and FIG. 12(b) illustrates a state in which packs are disposed. As illustrated in FIG. 12(b), it is possible to densely dispose the packs on the surface of the base material 2 by the packing unit 121.

When the partition position calculation unit 122 generates the partition position data 113, the partition shape calculation unit 123 specifies a shape of each partition.

The partition shape calculation unit 123 specifies the shape of the partition in accordance with a position where each partition P is provided. The partition P is provided on the base material having a three-dimensional shape, and thus a designation direction in which the partition P can be visually recognized is limited in accordance with the position where the partition P is provided. The partition P has a surface that is likely to be visually recognized from the designation direction so as to express a part of a content displayed in a visually recognized designation direction. Since a surface relating to an invisible designation direction is not provided, more resources can be used to display one content, and a detailed content can be displayed.

A method of calculating the shape of the partition P provided in any cell by the partition shape calculation unit 123 will be described. In advance, a size of the cell C (a length in an X-axis direction and a length in a Y-axis direction), a designation direction, and the number (n) of designation directions are specified. Here, the cell C has a cubic shape in which the length in the X-axis direction and the length in the Y-axis direction are the same as each other. In addition, a distance on a diagonal line of the cell C is 2r. Note that, in a case where the base material 2 does not have a planar shape, a virtual sphere is formed to intersect the surface of the base material 2.

As illustrated in FIG. 5, a virtual sphere having a radius r centered on the center Cs of the cell C is assumed. An intersection with the virtual sphere when observing the center Cs from a designation direction is set as a generatrix corresponding to the designation direction. In the example illustrated in FIG. 5, the generatrix T1 is determined with respect to a designation direction in which the visual point E1 is observed from the center Cs. Similarly, the generatrix T2 is determined with respect to a designation direction in which the visual point E2 is observed from the center Cs. The generatrix T3 is determined with respect to a designation direction in which the visual point E3 is observed from the center Cs.

When the generatrices corresponding to respective designation directions are determined, a three-dimensional Voronoi diagram is determined by dividing a region of a space on the cell C in accordance with which generatrix is close. A portion obtained by cutting the three-dimensional Voronoi diagram by a virtual sphere having a radius r centered on the center Cs of the cell C becomes a skeleton (center/core) of the partition P.

The skeleton of the partition P is a part of a Voronoi plane in the Voronoi diagram in which a generatrix is virtually provided in each of a plurality of directions.

However, since the skeleton of the partition P obtained by calculation is a so-called manifold, the skeleton has no thickness and cannot be shaped. Here, the skeleton is set as a center, and a plane M is provided at a position distant from the skeleton by a designated distance I. The plane M is formed so that a distance to a closest skeleton becomes I. A three-dimensional shape including the plane M becomes the partition P. Note that, the distance I is sufficiently smaller than the radius r of the virtual sphere. When a value of the distance I is large, an area of a plane to which a color is applied decreases, and visibility may deteriorate. Accordingly, the value is preferably as small as possible. The value of the distance I depends on the performance of a device (a 3D printer) that forms the partition P, or the like.

Here, the plane M included in the partition P is expressed by Expression (1) by using implicit function modeling.

[Mathematical Formula 1]

$$M=\{x\ I|\|x-s\|-l=0, s \in S\} \quad \text{Expression (1)}$$

M: Plane that constitutes a partition
x: Point on M
S: Skeleton of the partition
l: Distance from the skeleton of the partition to the plane M The plane M of the partition P which is expressed by Expression (1) is a non-manifold plane. The thickness of the partition P in Expression (1) becomes 2l. When minimum resolution of the 3D printer is set to 2l, manufacturing can be performed with a minimum error. Note that, Expression (1) is a description of a set, but Expression (2) is turned into a triangular mesh by polygonizer. According to this, an individual partition P generated ensures a water-tight mesh.

[Mathematical Formula 2]

$$\|x-s\|-l=0 \quad \text{Expression(2)}$$

Note that, a specific shape of the partition P may be appropriately changed. For example, a plurality of shielding members formed by the partition P may be integrally formed as illustrated in FIG. 5, or may be individually formed.

In addition, the skeleton of the partition P includes an intersection of lines of sight when observing the display medium 1 from a plurality of directions. As illustrated in FIG. 1 and FIG. 2, in a case where designation directions are provided symmetrically with respect to the center Cs of the cell C, the intersection of the lines of sight is provided at the center Cs of the cell C. In addition, the intersection of the lines of sight becomes an intersection of Voronoi planes in a Voronoi diagram in which a point that is virtually provided in the plurality of directions is set as a generatrix. In other words, the shielding member of the partition P is formed to radially divide a space on the cell C from the center Cs of the cell C.

Figure 13:
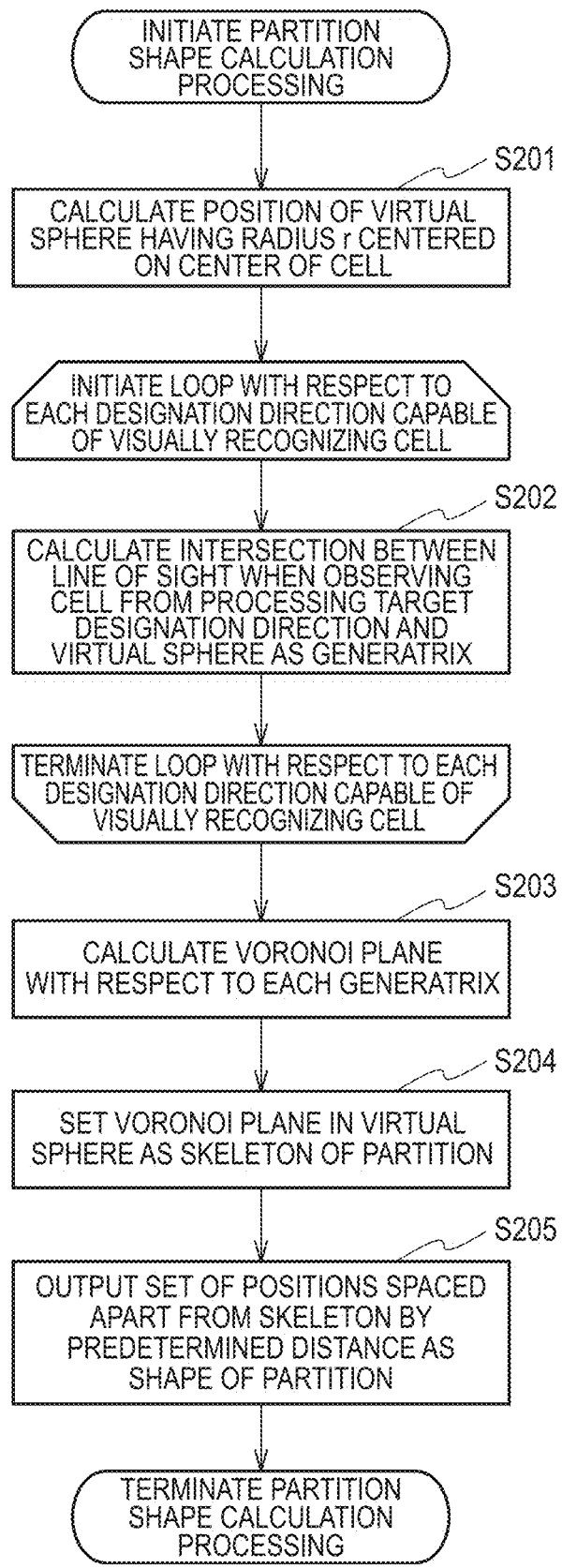
FIG. 13 is a flowchart illustrating partition shape specifying processing according to the embodiment of the invention.

Partition shape calculation processing by the partition shape calculation unit 123 will be described with reference to FIG. 13. The processing illustrated in FIG. 13 is processing of calculating a shape of one partition P.

In step S201, the partition shape calculation unit 123 calculates a position of a virtual sphere having a radius r centered on the center Cs of the cell C of a processing target.

The partition shape calculation unit 123 repeats the processing in step S102 with respect to each designation direction. In step S102, the shape specifying unit 21 calculates an intersection of a line of sight observing the cell C from a designation direction of a processing target and the virtual sphere calculated in step S101 as a generatrix. When the generatrix is calculated with respect to respective designation directions, the process proceeds to step S203.

In step S203, the partition shape calculation unit 123 calculates a Voronoi plane with respect to each of generatrices calculated in step S202. In step S204, among a plurality of the Voronoi planes calculated in step S203, the partition shape calculation unit 123 specifies a shape within the virtual sphere calculated in step S201 as a skeleton of the partition P provided in the cell C of a processing target. An inside when cutting the Voronoi plane calculated in step S203 by the virtual sphere calculated in step S201 becomes the skeleton of the partition P.

In step S205, the partition shape calculation unit 123 specifies a shape of the partition P by providing a thickness to the skeleton of the partition P calculated in step S204. Here, a set of positions spaced apart from the skeleton of the partition P specified in step S204 by a predetermined distance is specified as the shape of the partition P. The specified shape of the partition is output as the partition shape data 114.

The partition shape calculation unit 123 generates the partition shape data 114 that specifies a shape of each partition P.

(Verification Unit)

With respect to the position and the shape of the partition P which are calculated by the calculation unit 100, the verification unit 130 verifies whether or not the 3D printer can recognize the shape of the display medium 1. In addition, the verification unit 130 changes the position of the partition P so that the 3D printer can recognize the shape of the display medium 1.

The calculation unit 100 defines packs including partitions P, determines a position of each of the partitions P by densely arranging the packs, and specifies the shape of each of the partition Ps. Accordingly, the partitions P may be in contact with each other, and outer edges of the partitions P may intersect each other. When the outer edges of the partitions P intersect each other, water-tightness of the display medium 1 cannot be secured, and the 3D printer cannot grasp a surface shape of the display medium 1.

Therefore, the verification unit 130 changes a position of a partition P that intersects another partition P so that the individual partition P becomes independent from each other, thereby eliminating the intersection between the partitions P. According to this, the verification unit 130 can specify the surface shape of the display medium 1 through update to a position of the partition P where the display medium 1 can be formed by the 3D printer.

The verification unit 130 includes partition position data 113, partition shape data 114, intersection data 131, an intersection specifying unit 141, and a changing unit 142.

The partition position data 113 and the partition shape data 114 are data generated by the calculation unit 100.

The intersection data 131 is data that is generated by the intersection specifying unit 141 and specifies a partition P that intersects another partition P from a position and a shape of a plurality of partitions P provided in the display medium 1.

In a case of adding the partition P to a position specified by the partition position data 113, the intersection specifying unit 141 specifies a partition P that intersects a shape of another partition P. The intersection specifying unit 141 specifies positions and shapes of individual partitions P, specifies a partition P that intersects another partition P, and stores the specified positions, the specified shapes, and the specified partition P in the intersection data 131.

The changing unit 142 changes a position to which the partition P specified as intersecting the other partition P is added into a position that does not intersect a shape of the other partition P. The changing unit 142 may search a position that does not intersect the other partition P within a predetermined range from the partition P specified as an intersecting partition P, or may search any one site on the surface of the base material 2. In the embodiment of the invention, since a shape of the partition P is specified from a relationship between a providing position thereof and a designation direction, it is preferable that the position is changed to a position where the relationship with the designation direction does not significantly collapse even in the changed position.

In a case where there is no position to which the specified partition P is added, the changing unit 142 deletes the partition P that is specified as intersecting the other partition.

The changing unit 142 deletes data of a deletion target partition P from the partition position data 113 and the partition shape data 114.

(Generation Unit)

The generation unit 150 generates the shape data 12 of the display medium 1 (model) by sum-of-sets operation of the shape of the base material 2, and a position to which each of partitions P (component) is added and a shape of each of the partitions P (component). The position of each of the partitions is a position that is specified by the partition position data 113 and is calculated by the partition position calculation unit 122, or a position after change by the changing unit 142.

In a case of calculating the sum-of-sets by adding the shape of each of the partitions P with respect to the base material 2, addition processing is required in accordance with the number of the partitions P, and thus a calculation cost is high. Therefore, the generation unit 150 calculates sum-of-sets of the shape of each of the partitions P in advance, and further calculates sum-of-sets with the shape of the base material 2. According to this, the number of times of processing of adding the partition P to the base material 2 is one, and the calculation cost can be suppressed.

The shape data 12 generated by the generation unit 150 is shape data of the display medium 1 in which a plurality of partitions P are provided in the base material 2. At this time, the partitions P have a surface with respect to a designation direction in which a providing position of the partition P can be visually recognized, and a color of a part of a content to be displayed in the designation direction is expressed on the surface.

(Shape Specifying Method)

Figure 14:
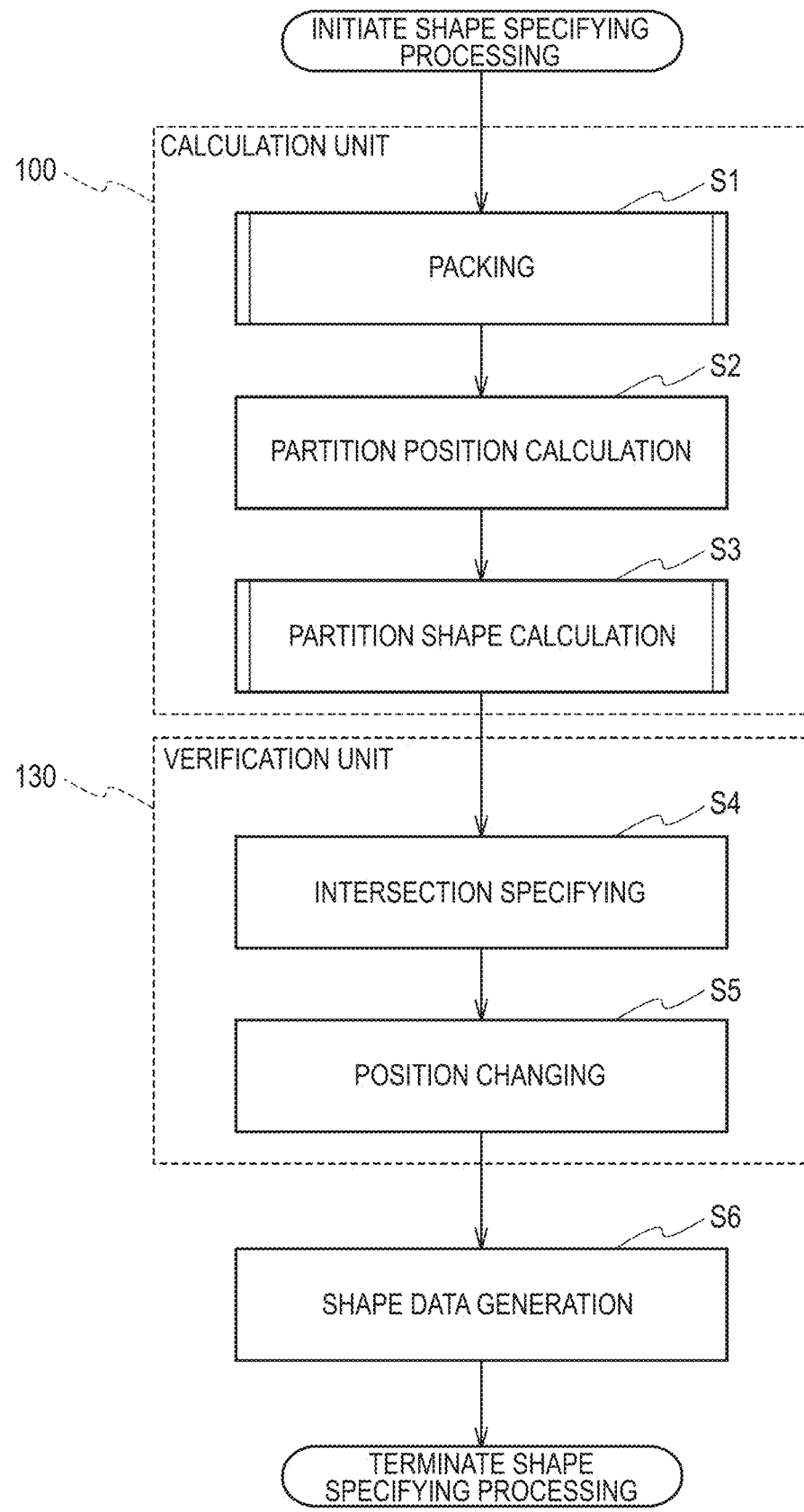
FIG. 14 is a flowchart illustrating shape specifying processing according to the embodiment of the invention.

A shape specifying method by the shape specifying unit 21 will be described with reference to FIG. 14.

First, in step S1, the calculation unit 100 causes the packing unit 121 to densely dispose packs including the partitions P on the surface of the base material 2. This processing is as described above with reference to FIG. 11.

In step S2, the calculation unit 100 disposes partitions P in the packs disposed in step S1 by the partition position calculation unit 122, and specifies a position of the partitions. In step S3, the calculation unit 100 causes the partition shape calculation unit 123 to calculate a shape of the partitions P in correspondence with the position of the partitions P which is calculated in step S2. This processing is as described above with reference to FIG. 13.

When the position and the shape of the partitions P are calculated, in step S4, the verification unit 130 causes the intersection specifying unit 141 to specify a partition P that intersects another partition P. In step S5, the verification unit 130 causes the changing unit 142 to change a position of the partition P that intersects the other partition P, thereby eliminating the intersection.

In step S6, the generation unit 150 generates the shape data 12 of the display medium 1 in accordance with the shape of the base material 2, the position of the partitions which is specified in step S2 or step S5, and the shape of the partitions P which is specified in step S3.

In the shape data 12 generated as described above, watertightness of the display medium 1 is secured, and the 3D printer can grasp the shape of the display medium 1.

(Color Determination Unit)

In the embodiment of the invention, the surface of the display medium 1 is virtually divided into a plurality of sub-cells L, and the sub-cells L are colored with a color for expressing a content. The sub-cells L are provided not only on the surface of the partitions P, but also on the surface of the base material 2 excepting for a providing surface of the partitions P.

First, the color determination unit 23 specifies sub-cells L which are visually recognized from each of a plurality of directions. The color determination unit 23 determines whether or not each of the sub-cells L can be seen from each designation direction. In addition, as expressed by the following Expression (3), the color determination unit 23 determines a color that is applied to each of the sub-cells L so that a color formed by respective colors of the sub-cells L visually recognized from each of a plurality of directions approaches a color of a portion of the partition P in a content corresponding to each of the plurality of directions.

The color determination unit 23 specifies a color value of a processing target cell in each target image that is displayed with respect to each designation direction. The color determination unit 23 determines colors of respective sub-cells L of the cell so that a mixture of colors of sub-cells L capable of being visually recognized when observing the partition P from the designation direction becomes the color value of the processing target cell in the target image corresponding to the designation direction. The same processing is repeated with respect to respective designation directions, and the color of the sub-cells L of the processing target cell is optimized. In addition, the color determination unit 23 calculates a color that is applied to each sub-cell of the display medium 1 in a similar manner.

The color determination unit 23 generates the color value data 14 that specifies an optimized color of each of the sub-cells L. The color value data 14 specifies the color of the sub-cell L provided in each cell C of the display medium 1. The color determination unit 23 stores the generated color value data 14 in the storage device 10.

Note that, the display medium 1 according to the embodiment of the invention can display a satisfactory content with respect to a designation direction, but even in a case of being slightly away from the designation direction, the content can be displayed. For example, in a case where a direction is away from the designation direction, but the direction is distant from another designation direction, the content that is displayed with respect to the designation direction is displayed in a slightly deformed manner. In a case where the content is less deformed or the content is deformed within a range having a less influence on recognition of the content, a user can understand the meaning of the content even though the content is deformed.

On the other hand, for example, in a case where the display medium 1 is visually recognized in a direction far from any designation direction such as a case where the display medium 1 is visually recognized on the Voronoi plane, with regard to a content that can be visually recognized for a user, the user cannot visually recognize the meaning of the content differently from the content intended by the display medium 1 in many cases.

In addition, in the embodiment of the invention, description is given of a case where a color of a content is applied onto the base material 2, but there is no limitation to the case. For example, a color may not be applied to the base material 2, and a color of a content may be applied to only a surface of the partition P.

As illustrated in FIG. 1 and FIG. 2, a surface where the partition P is formed is virtually divided into a plurality of sub-cells L. In the partition P, a portion that is viewed from at least one designation direction among a plurality of designation directions is divided into the plurality of sub-cells L. A color for expressing a content is applied to each of the sub-cells L. The sub-cells L may be virtually divided without being visually divided. For example, the same color is given to adjacent sub-cells L, and the sub-cells L may not be visually divided.

Note that, the plurality of sub-cells L illustrated in FIG. 5 are separated from each other for the sake of explanation, but the sub-cells L are preferably formed adjacently to each other. In addition, the thickness of the sub-cells L illustrated in FIG. 5 is enlarged to improve visibility, but there is no limitation to the thickness. Although not illustrated in the drawing, in the embodiment of the invention, the sub-cells L are also provided on the base material 2 illustrated in FIG. 5.

The size of the sub-cells L is sufficiently smaller than a distance from a visual point. The visual point is provided at a location distant to a certain extent in which juxtapositional additive color mixing is established.

The sub-cells L are regions which divide the surface of the display medium 1. As illustrated in FIG. 1, FIG. 2, and the like, the sub-cells L are regions corresponding to intersections when dividing the surface of the partition P into a mesh shape. The sub-cells L may be regions in which intersections when being divided into a mesh are set as vertices, or may be regions in which the intersections are set as the center.

A method of calculating a color that is applied to the surface of the display medium 1 will be described.

First, a sub-cell L that is visually recognized from a designation direction is specified for every designation direction. Here, the display medium 1 is rendered from each designation direction to specify a sub-cell L that is viewed from the designation direction and a sub-cell L that is not viewed from the designation direction. With respect to each designation direction that is assumed by the display medium 1, a sub-cell L that is viewed from the designation direction and a sub-cell L that is not viewed from the designation direction are specified.

Next, a method of specifying the color that is applied to each sub-cell L will be described. A color value of the sub-cell L is determined so that a color value of a cell where the sub-cell L is located in a content corresponding to each designation direction can be expressed by the sub-cell L visually recognized from the designation direction. At this time, the color value of the content may be expressed by a plurality of the sub-cells L visually recognized from the designation direction by a juxtapositional additive color mixing method.

Specifically, the color of each of the sub-cells L is determined so that a difference between a color Ac of a cell viewed from the designation direction and a color B of a processing target cell of a content corresponding to the designation direction decreases by Expression (3). The color Ac of the cell is expressed by mixing of colors applied to respective sub-cells L capable of being visually recognized from the designation direction.

$$\operatorname{argmin}_{c} \|Ac - C\| \qquad \text{[Mathematical Formula 3]}$$

A: Matrix (n×p) showing possibility or impossibility of visual recognition of each sub-cell from each designation direction (1 when seen from designation directions, and 0 when not seen therefrom)
n: The number of designation directions
p: The number of sub-cells
c: Colors of respective sub-cells (p×3)
B Matrix (n×3) of a color of a processing target cell of a content in each designation direction Note that, the color of each of the sub-cells L may be expressed, for example, by a matrix of three parameters when being expressed by three primary colors of RGB (red, green, and blue), CMY (cyan, magenta, and yellow), or the like.

As described above, when the color of each of the sub-cells L is determined with respect to one cell, a color of each of sub-cells L is similarly determined with respect to another cell. In addition, in a case where a region in which a cell is not disposed exists on the surface of the base material 2, the color determination unit 23 also sets sub-cells L with respect to the region, and a color to be applied to the sub-cells L may also be calculated as described above.

When the cell that is formed and colored as described above is disposed, the display medium 1 can display different contents with respect to respective designation directions.

In the display medium 1 according to the embodiment of the invention, since the partition P increases an area of a cell where the partition P is provided, and expresses a part of a content corresponding to a designation direction, a plurality of contents with a wide color gamut and high luminance can be displayed.

Figure 15:
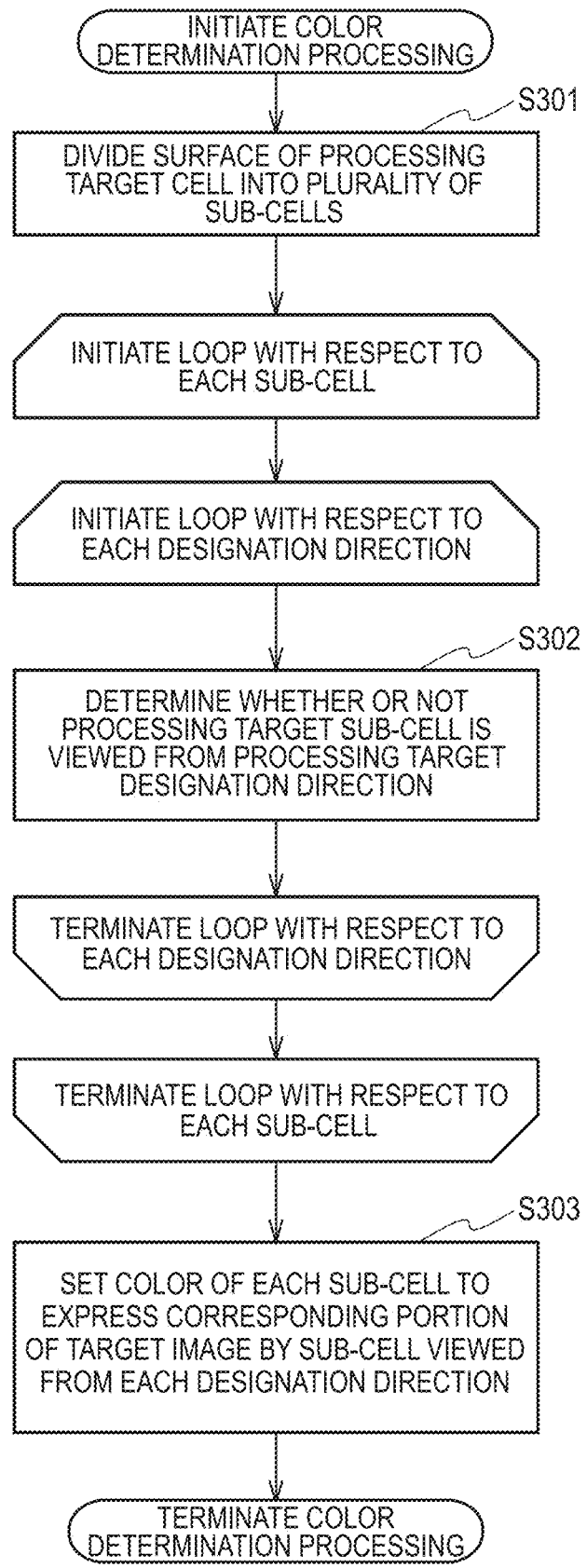
FIG. 15 is a flowchart illustrating color determination processing according to the embodiment of the invention.

Color specifying processing by the color determination unit 23 will be described with reference to FIG. 15. An example illustrated in FIG. 15 is processing of determining a color of sub-cells L on a surface of the base material 2 and the partition P in one cell.

In step S301, the color determination unit 23 divides a surface of a processing target cell C into a plurality of sub-cells L.

Processing in step S302 is executed with respect to the respective sub-cells L divided in step S301 and respective designation directions. In step S202, the color determination unit 23 determines whether or not a processing target sub-cell L is viewed from a processing target designation direction. When the processing in step S302 is terminated with respect to the respective sub-cells L and the respective designation directions, the process proceeds to step S303.

In step S303, the color determination unit 23 sets a color of each of the sub-cells L so that a target color value can be expressed by sub-cells L viewed from each of the designation directions. Here, the target color value is a color value to be expressed by a processing target cell among color values of each content displayed in each of the designation directions. The target color value is provided for every designation direction. The color determination unit 23 optimizes color values of respective sub-cells L on the surface of the cell C to satisfy a requirement in which color mixing of respective sub-cells L viewed from each designation direction approaches a color value of a processing target cell of a content to be displayed in each designation direction.

As described above, the display medium 1 is formed when the processing apparatus 3 calculates a shape of a partition P of each cell and a color that is applied to the cell on the basis of Expressions (1) to (3).

In addition, since the display medium 1 according to the embodiment of the invention can provide information having different meanings with respect to a plurality of directions, more information can be provided in a limited region.

First Modification Example

In the embodiment of the invention, description has been given of a case where the content that is displayed in each designation direction by the display medium 1 is a still image, but there is no limitation to the case. For example, in a case where the surface of the partition P is formed as a display capable of displaying a moving image, and the surface of the partition can be dynamically changed, the content that is displayed in each designation direction by the display medium 1 may be a moving image. Examples of the display capable of displaying the moving image include a liquid crystal display, an organic electro-luminescence (EL) display, and the like.

In this case, each frame data to be displayed at the same time among a plurality of target moving images becomes a target image. The processing apparatus 3 optimizes a color of respective sub-cells L on the display medium 1 so that each frame data to be displayed at the same time in each designation direction among moving images to be displayed by the display medium 1 approaches each target image.

In addition, the sub-cells L according to the embodiment of the invention are formed on a display. The sub-cells L are pixels constituting the display or a plurality of adjacent pixel groups.

Second Modification Example

In the embodiment of the invention, description has been given of a case where the display medium 1 is formed by the 3D printer, but there is no limitation to the case. In the embodiment of the invention, the size of the display medium 1 is restricted by specifications of the 3D printer, but the display medium 1 may be formed in any size.

For example, the display method of the display medium 1 according to the embodiment of the invention is applicable to a large-sized display of several meters or several tens of meters such as a billboard provided in a baseball stadium, a concert hall, and a city area. The large-sized display is divided into a plurality of cells, and a partition having surfaces corresponding to a plurality of designation directions is formed in each of the cells. A color that constitutes an output image corresponding to a designation direction is applied to each of the surfaces of the partition.

When the display method according to the embodiment is applied to the large-sized display, it is possible to display a content corresponding to each person's position for more people in a wider region.

For example, a display medium that is provided at the center of a hall can display different contents with respect to respective directions, respectively.

In addition, the large-sized display provided in the city area can be utilized as an information sign on the road. A plurality of pieces of different information corresponding to respective designation directions can be simultaneously provided to persons located at different designation directions with respect to a large-sized display. For example, the large-sized display displays signals with respect to different designation directions, thereby realizing traffic signals corresponding to a plurality of directions with one display.

The display method according to the embodiment of the invention can provide information with respect to a specific direction. For example, when providing the display medium according to the embodiment of the invention at an intersection point where a plurality of vehicle lines coexist, the display medium can display a signal by specifying each of the vehicle lines. According to this, it is possible to prevent that a driver entering the intersection point erroneously mistakes signal display for the driver's vehicle line and signal display for other vehicle lines. Particularly, since the display medium 1 according to the embodiment of the invention has a three-dimensional shape, a content can be displayed in any direction. The display medium 1 is appropriately provided at a location that is visually recognized by persons who locate in respective directions of the intersection point or the like.

In addition, in the embodiment of the invention, description has been given of a case where the display medium displays a content capable of being directly visually recognized by human's eyes, but there is no limitation to the case. An output image of the display medium may be imaged by a camera, and a person can visually recognize a content through the captured image. In a case where the display medium is large, for example, a person can visually recognize a content through aerial imaging by a drone or the like.

Third Modification Example

The display medium according to the embodiment of the invention is also applicable to a technology of providing stereoscopic vision with naked eyes.

The display medium according to the embodiment of the invention can display different contents with respect to designation directions. A designation direction in which a display medium according to a third modification example displays a content is matched to a difference between right and left visual angles of a user who visually recognizes the display medium. The display medium displays a content for a right eye with which a user can perceive stereoscopic vision with respect to a designation direction for the right eye, and a content for a left eye with respect to a designation direction for the left eye.

As described above, the display medium according to the third modification example may be applicable to naked eye 3D.

Application Example

An application example that uses the display medium 1 according to the embodiment of the invention will be described with reference to FIG. 16 to FIG. 21.

A content that is displayed by a display medium 1 according to the application example is image data of a portion where the display medium 1 is provided in a field of view in which a position where the display medium 1 is provided is observed from a visual point in a predetermined direction in a state in which the display medium 1 is not provided. In the application example, the content is image data of a portion where the display medium 1 is provided in a field of view including a position where the display medium 1 is scheduled to be provided. With respect to each designation direction in which the display medium 1 displays a content, a field of view observed from the direction is displayed by the display medium 1. According to this, the display medium 1 displays the background in a state in which the display medium 1 does not exist, and thus an effect in which the display medium 1 is transparent or does not exist can be realized.

Figure 16:
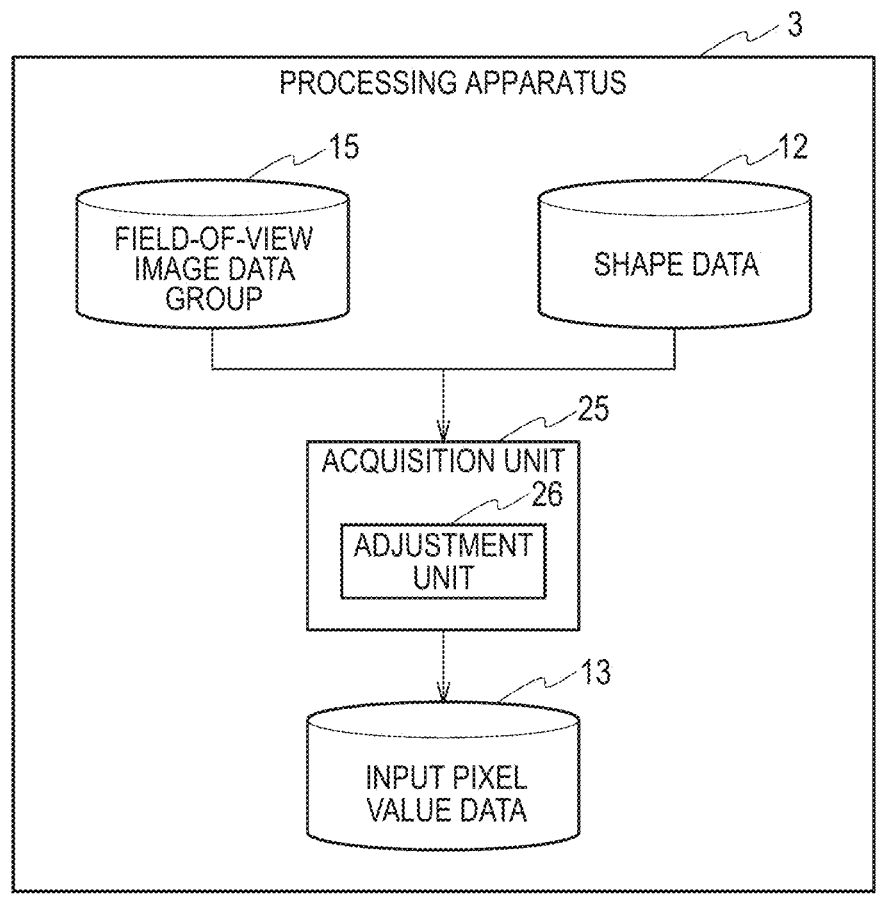
FIG. 16 is a view illustrating a functional block of a processing apparatus that generates input pixel value data according to an application example.

Processing of generating input pixel value data 13 that is a content according to the application example will be described with reference to FIG. 16. In the example illustrated in FIG. 16, a field-of-view image data group 15, shape data 12, and input pixel value data 13 are stored in the storage device 10. An acquisition unit 25 may be provided in the processing control device 20.

The field-of-view image data group 15 is an image data group of a field of view in which a state in which the display medium 1 is not provided is observed when viewing a position where the display medium 1 is scheduled to be provided from a visual point in a designation direction. Here, the designation direction is a direction passing through a visual point direction in which the display medium 1 is visually recognized from the display medium 1 to be provided. A state in which the display medium 1 is not provided represents a state before the display medium 1 that displays a content is provided. Each image data of the field-of-view image data group 15 does not include an external appearance of the display medium 1. The field-of-view image data group 15 includes image data of a field of view for every designation direction.

The shape data 12 and the input pixel value data 13 are as described above with reference to FIG. 8. In the application example, the shape data 12 is data capable of specifying a shape of the display medium 1 when visually recognizing the display medium 1 from a visual point in the designation direction by rendering or the like for every designation direction. In the application example, the input pixel value data 13 is data that associates the designation direction in which a content is displayed by the display medium 1, and image data of a portion where the display medium 1 is provided in a field of view in which a position where the display medium 1 is provided is observed from a visual point in a predetermined direction (designation direction) in a state in which the display medium 1 is not provided. For example, the input pixel value data 13 relating to any designation direction is generated by cutting out a shape portion of the display medium 1 from a field of view in which a position where the display medium 1 is provided is observed from a visual point in the designation direction.

The acquisition unit 25 acquires each image data of a portion where the display medium 1 is provided in a field of view in which the position where the display medium 1 is provided is observed from each of visual points in a plurality of directions in a state in which the display medium 1 is not provided. The acquisition unit 25 sets respective pieces of image data corresponding to the plurality of directions as the input pixel value data 13. The color determination unit 23 determines a color to be applied to each sub-cell of each partition P with reference to the input pixel value data 13.

For example, the acquisition unit 25 cuts out a shape portion of the display medium 1 from a field of view in which a position where the display medium is provided is observed from a visual point in a designation direction of the display medium 1. With respect to each designation direction, the acquisition unit 25 generates image data obtained by cutting out the shape portion of the display medium 1, and generates the input pixel value data 13.

Figure 18:
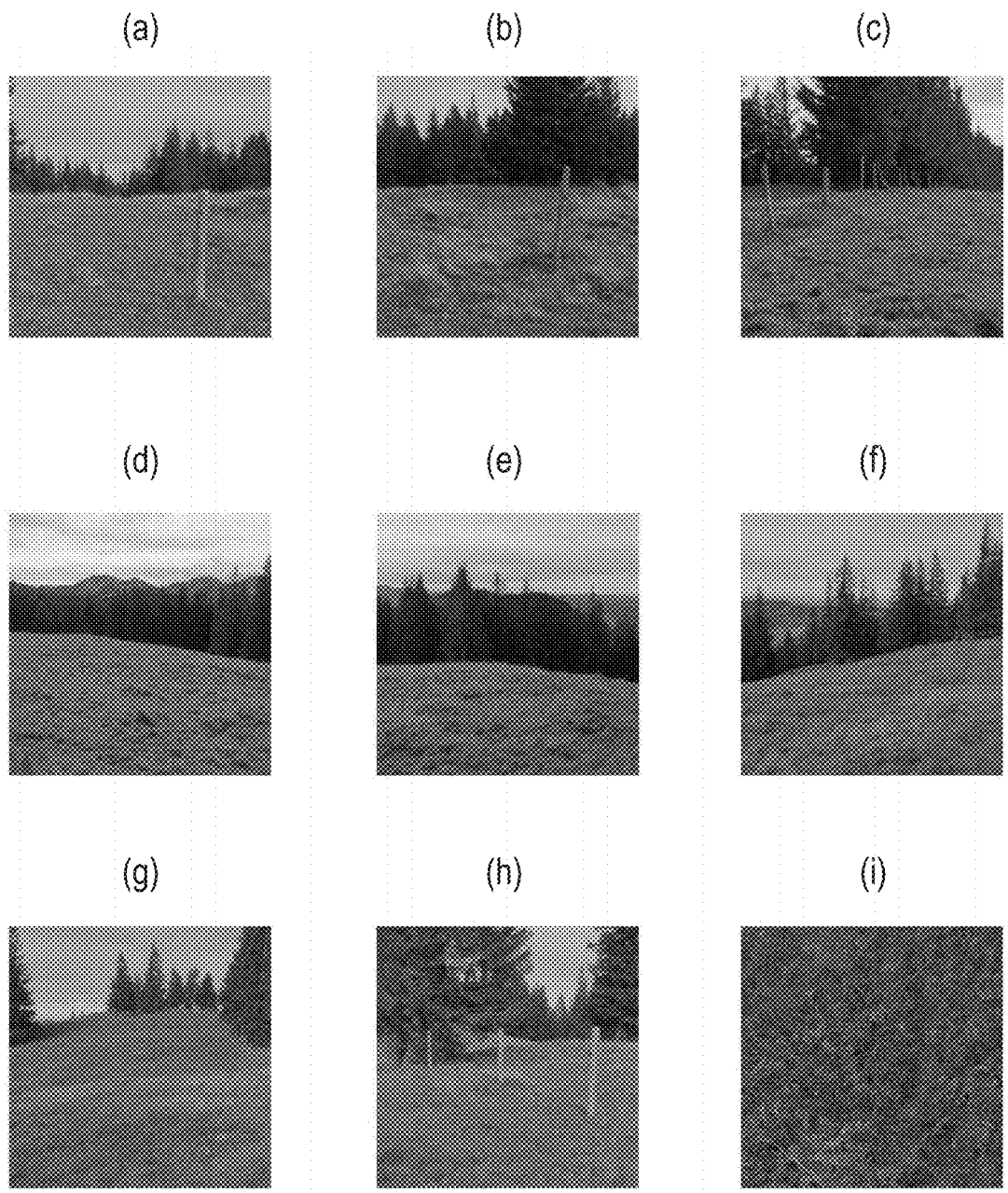
FIG. 18 is an example of image data for every designation direction.
Figure 19:
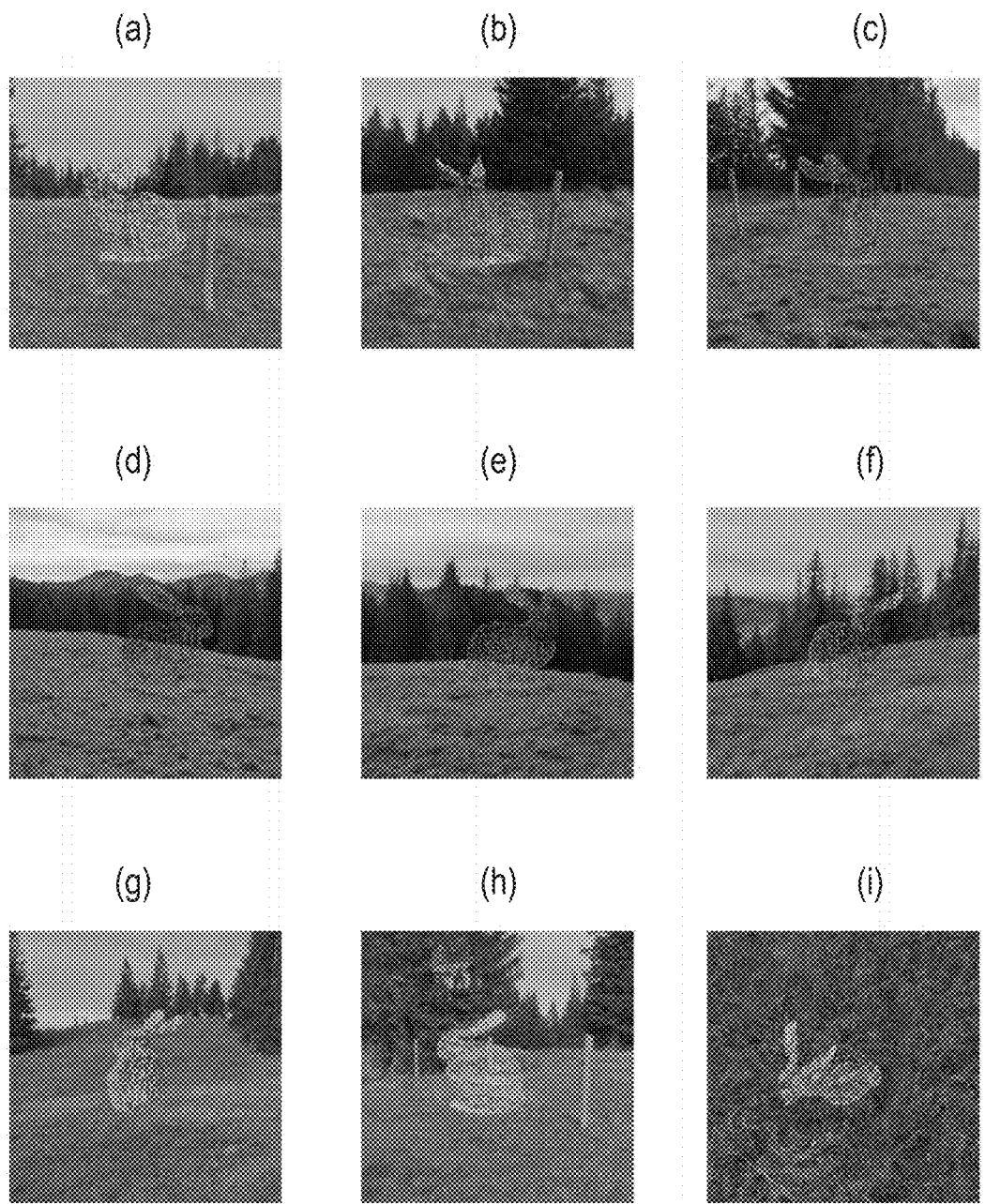
FIG. 19 is an example of image data for every designation direction which specifies a position where the display medium is provided.

Processing in the acquisition unit 25 will be described with reference to FIG. 17 to FIG. 19. As the designation direction, FIG. 18 and FIG. 19 illustrate totally nine directions including eight directions with an elevation/depression angle of 0° and azimuth angles of 0°, 45°, 90°, 135°, 180°, 225°, 270°, and 315°, and one direction with an elevation angle of 90°.

The acquisition unit 25 acquires polar coordinate image data by providing a 360-degree celestial sphere camera at a position where the display medium 1 is provided. The polar coordinate image data specifies a wavelength distribution of light with respect to the celestial sphere from a position where the display medium 1 is provided. The acquisition unit 25 associates elevation/depression angles θ and azimuth angles α with each other with respect to the polar coordinate image data as illustrated in FIG. 17.

Figure 17:
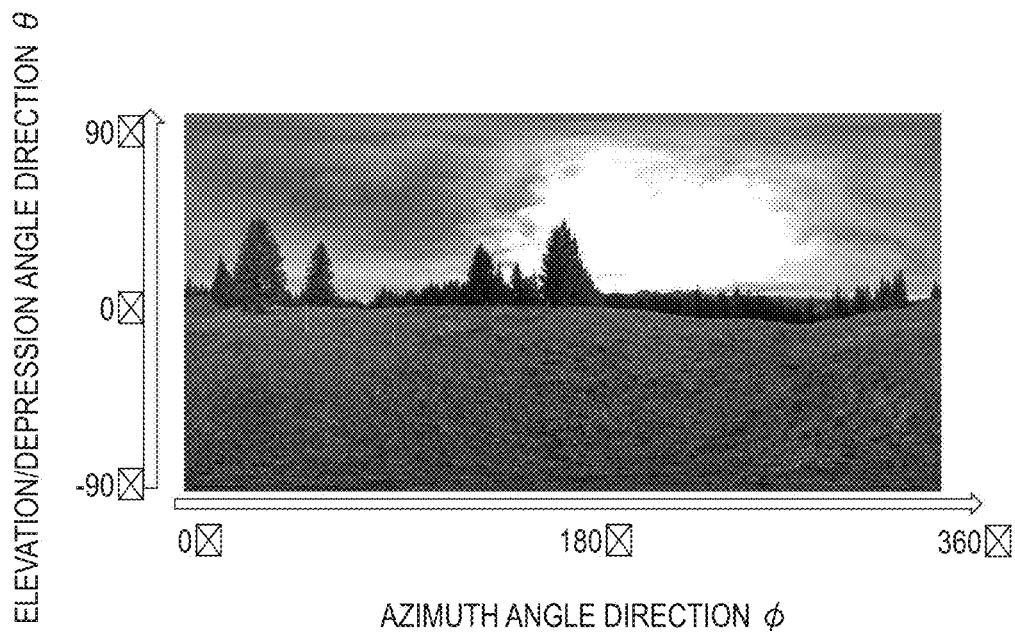
FIG. 17 is an example of polar coordinate image data acquired by a 360-degree celestial sphere camera provided at a position where the display medium is provided.

The acquisition unit 25 cuts out a range including the position where the display medium 1 is provided when viewed from each visual point from an image illustrated in FIG. 17. For example, the range is specified by an angle of view such as an angle of view of 39.6°. Each visual point is provided in a designation direction in which the display medium 1 can perform display. Here, the designation direction is specified by the elevation/depression angles θ and the azimuth angles α. According to this, the acquisition unit 25 generates image data for every designation direction as illustrated in FIG. 18.

Note that, in the embodiment of the invention, the image data for every designation direction is generated from the polar coordinate image data captured by the celestial sphere camera, but there is no limitation to the configuration. For example, a direction where the display medium 1 is provided may be imaged from a visual point in a designation direction of the display medium 1, and image data for every designation direction may be generated.

The acquisition unit 25 specifies a portion where the display medium 1 is provided in the image data of the designation direction as illustrated in respective drawings of FIG. 19. At this time, a portion where the display medium 1 is provided is specified in accordance with a direction of the display medium 1 and a designation direction corresponding to the image data. Specifically, a shape of the display medium 1 is different in the respective drawings of FIG. 19. The acquisition unit 25 cuts out a portion where the display medium 1 is provided from image data of each designation direction, and generates the input pixel value data 13.

Here, a shape of a partition P that is provided at a point p on the display medium 1 will be described. n designation directions of the display medium 1 are set as polar coordinates $(\theta_{e1}, \phi_{e1}), \ldots (\theta_{en}, \phi_{en})$. The polar coordinates $(\theta_{e1}, \phi_{e1}), \ldots \theta_{en}, \phi_{en})$ are converted into orthogonal coordinates $(e_{x1}, e_{y1}, e_{z1}), \ldots (e_{xn}, e_{yn}, e_{zn})$. At this time, E is set as a set of e, and the shape of the partition P provided at the point p on the display medium 1 is specified by respective generatrices provided at positions moved from any point p by a distance r in respective designation directions e. A set T of the generatrices provided at the positions moved by the distance r in the respective designation directions e is expressed by $T=\{p_x+re_x, p_y+re_y, p_z+re_z| (e_x, e_y, e_z) \in E\}$. The shape of the partition P is specified by specifying a Voronoi diagram from a generatrix group calculated with respect to the respective designation directions, and by cutting out the specified Voronoi diagram in a predetermined shape such as a spheric shape.

The input pixel value data 13 is specified as described above. Accordingly, the display medium 1 displays the background in a state in which the display medium 1 does not exist, and can realize an effect in which the display medium 1 is transparent or does not exist.

Figure 20:
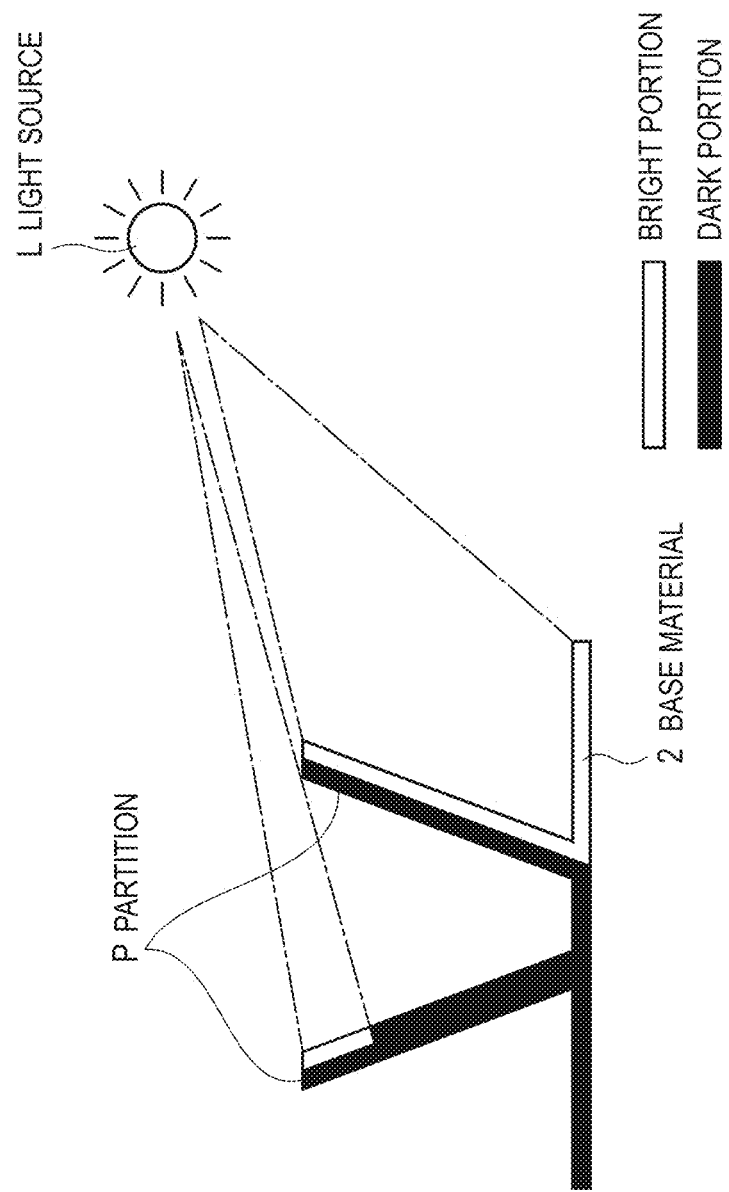
FIG. 20 is a view illustrating a bright portion that is directly irradiated with light and a dark portion other than the bright portion in a surface of the display medium.

The entirety of the display medium 1 may not be illuminated due to a position of a light source with respect to a position where the display medium 1 is provided, the shape of the display medium 1, or the like. For example, as illustrated in FIG. 20, in the surface of the display medium 1, a portion directly illuminated by light becomes bright, and a portion illuminated by only indirect light or a portion that is not illuminated by light becomes dark.

Here, the acquisition unit 25 may be provided with an adjustment unit 26 that adjusts a color of each image data of the portion where the display medium 1 is provided in consideration of a light irradiation situation on the surface of the display medium 1. The adjustment unit 26 acquires luminance obtained by observing the display medium 1 from each visual point in a state in which the display medium 1 is placed at a scheduled position. The adjustment unit 26 adjusts luminance of image data corresponding to each visual point so that the obtained luminance becomes target luminance. The acquisition unit 25 generates the input pixel value data 13 in accordance with the image data after adjustment. The color determination unit 23 determines a color to be applied to each sub-cell of the partition P with reference to the input pixel value data 13.

The adjustment unit 26 may also adjust luminance of each pixel to be target luminance with respect to each pixel in the image data.

Description will be given of any pixel of image data corresponding to a visual point in any designation direction. Target luminance of any pixel is set as $I_t$, and luminance observed at a position on the display medium 1 which corresponds to the pixel is set as $I_m$. In the pixel, a ratio of luminance that is deficient to the target luminance is $I_m/I_t$. For example, the target luminance is luminance of a pixel of image data obtained by cutting out a portion of the display medium 1 which corresponds to each visual point. When a target color expressed by the pixel, specifically, a color on the pixel data is set as $C_t$, a color c of the pixel after adjustment becomes $C_t * I_t/I_m$. The adjustment unit 26 adjusts luminance with respect to each pixel of the image data relating to each designation direction, and generates the input pixel value data 13.

When generating the input pixel value data 13 as described above, the adjustment unit 26 adjusts the luminance in accordance with a position where the display medium 1 is provided, and a color displayed by the display medium 1 can be adjusted to blend in better with a color of the background. The display medium 1 can realize a more accurate and transparent or non-existence effect.

Acquisition processing by the acquisition unit 25 will be described with reference to FIG. 21. With respect to each designation direction in which the display medium 1 displays a content, processing in step S401 to S405 is repeated.

First, in step S401, the acquisition unit 25 acquires field-of-view image data viewed from a visual point in a target designation direction. In step S402, the acquisition unit 25 renders a shape of a display medium viewed in the target direction from the shape data 12. In step S403, the acquisition unit 25 cuts out a shape portion of the display medium 1 which is specified in step S403 from the field-of-view image data acquired in step S401, and generates target image data. In step S404, the acquisition unit 25 adjusts luminance of each pixel in the target image data generated in step S403 so that luminance of the surface of the display medium 1 in a case where the display medium 1 is provided becomes target luminance.

When the processing is terminated in step S401 to step S405 with respect to each designation direction in which the display medium 1 displays a content, the acquisition unit 25 generates the input pixel value data 13 in step S405.

As described above, when the display medium 1 displays the content according to the application example, an effect in which the display medium 1 is transparent or does not exist can be realized.

Other Embodiments

As described above, description has been given in accordance with the embodiment of the invention, the Modification Examples 1 to 3, and the application example, but it should be understood that the statements and the drawings illustrating a part of the present disclosure do not limit the invention. From the disclosure, it should be understood by those skilled in the art that various alterative embodiments, examples, and application technologies are apparent.

Figure 8:
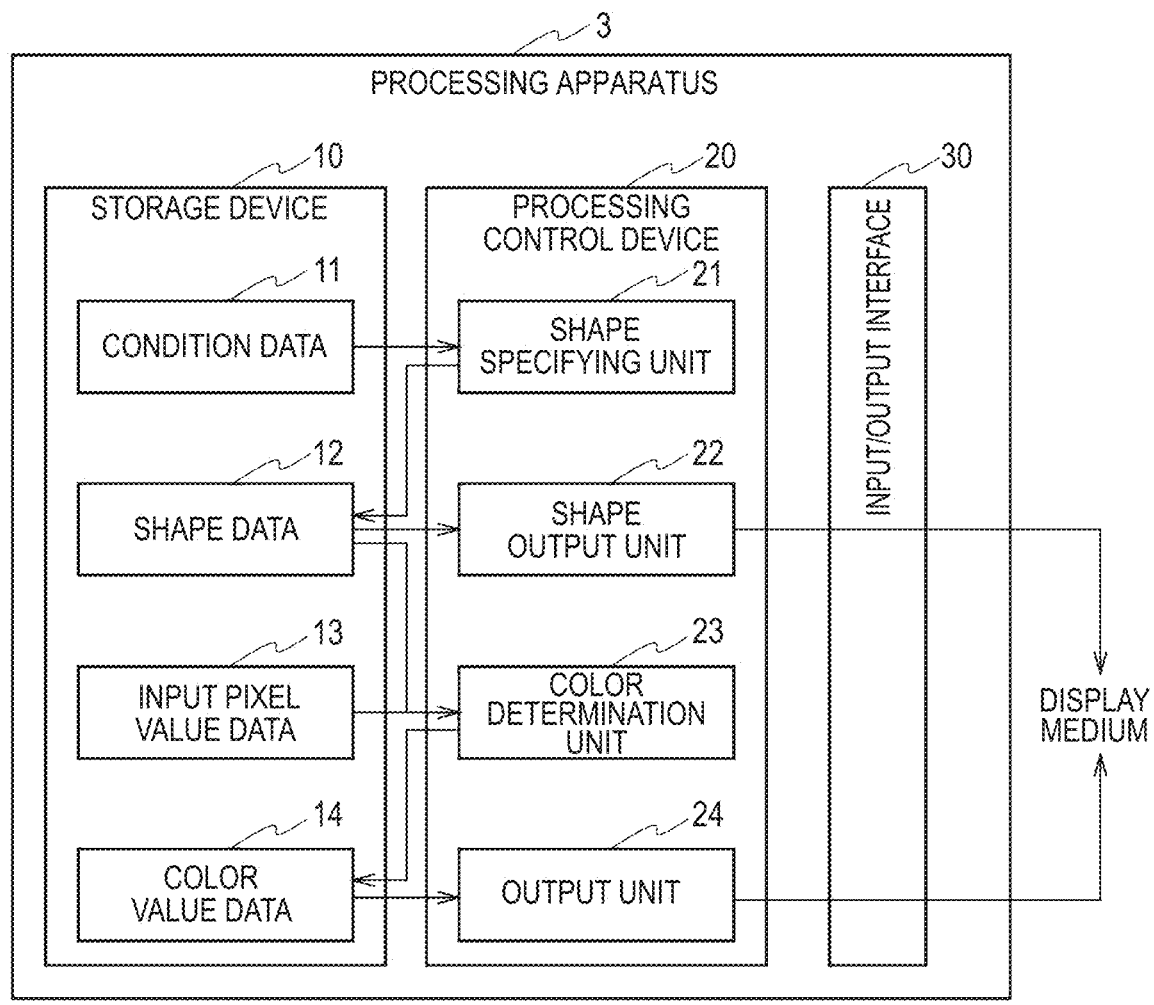
FIG. 8 is a view illustrating a hardware configuration and a functional block of a processing apparatus according to the embodiment of the invention.

For example, the processing apparatus described in the embodiment of the invention can be configured on one piece of hardware as illustrated in FIG. 8, or may be configured on a plurality of pieces of hardware in correspondence with a function or the number of processing. In addition, the processing apparatus may be realized on an existing processing system that also realizes another function.

It should be understood that the invention includes various embodiments and the like which are not described here. Accordingly, the technical scope of the invention is defined only by matters specifying the invention according to the appended claims valid from the description.

REFERENCE SIGNS LIST

1: display medium
2: base material
3: processing apparatus
10: storage device
11: condition data
12: shape data
13: input pixel value data
14: color value data
15: field-of-view image data group
20: processing control device
21: shape specifying unit
22: shape output unit
23: color determination unit
24: output unit
25: acquisition unit
26: adjustment unit
30: input/output interface
100: calculation unit
111: pack data
112: pack position data
113: partition position data
114: partition shape data
121: packing unit
122: partition position calculation unit
123: partition shape calculation unit
130: verification unit
131: intersection data
141: intersection specifying unit
142: changing unit
150: generation unit
A: space
B: shielding member
C: cell
Cs: center
L: sub-cell
P: partition
T: generatrix

The invention claimed is:

1. A display medium that displays contents different from each other in a plurality of directions, respectively, the display medium comprising:
   a base material that has a three-dimensional shape; and
   a partition that is provided on a surface of the base material and has a surface that radially divides a space on the surface of the base material for each of a plurality of directions,
   wherein a portion that is exposed when observing the display medium from a predetermined direction among the plurality of directions is applied with a color of a content corresponding to the predetermined direction, and the content is image data of a portion where the display medium is provided in a field of view in which a position where the display medium is provided is observed from a visual point in the predetermined direction in a state in which the display medium is not provided.

2. The display medium according to claim 1, wherein the partition has a surface that radially divides the space on the surface of the base material for each direction in which the partition is visually recognized among the plurality of directions.

3. The display medium according to claim 1, wherein the partition is formed in a cell that is provided on the surface of the three-dimensional shape, and a skeleton of the partition includes a part of a Voronoi plane in a Voronoi diagram in which a point that is virtually provided on a line connecting the direction and a point on the cell is set as a generatrix.

4. A processing apparatus that calculates a color applied to the display medium according to claim 1, a surface of the display medium being virtually divided into a plurality of sub-cells, and a sub-cell visually recognized from each of the plurality of directions being specified, the processing apparatus comprising:

an acquisition unit that acquires each image data of a portion where the display medium is provided in a field of view in which a position where the display medium is provided is observed from each visual point in the plurality of directions in a state in which the display medium is not provided; and a color determination unit that determines a color that is applied to the sub-cells so that a color formed by respective colors of the sub-cells visually recognized from each of the plurality of directions approaches a color of a portion of the image data corresponding to each of the plurality of directions.

5. A program that calculates a color applied to the display medium according to claim 1, a surface of the display medium being virtually divided into a plurality of sub-cells, and a sub-cell visually recognized from each of the plurality of directions being specified, the program causing a computer to function as:

an acquisition unit that acquires each image data of a portion where the display medium is provided in a field of view in which a position where the display medium is provided is observed from each visual point in the plurality of directions in a state in which the display medium is not provided; and a color determination unit that determines a color that is applied to the sub-cells so that a color formed by respective colors of the sub-cells visually recognized from each of the plurality of directions approaches a color of a portion of the image data corresponding to each of the plurality of directions.

6. A computer-readable recording medium that records the program according to claim 5.

\* \* \* \* \*